United States Patent
Hasegawa et al.

(10) Patent No.: US 8,381,038 B2
(45) Date of Patent: Feb. 19, 2013

(54) MANAGEMENT SERVER AND MANAGEMENT SYSTEM

(75) Inventors: Toshiyuki Hasegawa, Yokohama (JP); Yuji Mizote, Kamakura (JP); Takaki Kuroda, Machida (JP); Nobuo Beniyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 12/529,464

(22) PCT Filed: May 26, 2009

(86) PCT No.: PCT/JP2009/002319
§ 371 (c)(1),
(2), (4) Date: Sep. 1, 2009

(87) PCT Pub. No.: WO2010/137063
PCT Pub. Date: Dec. 2, 2010

(65) Prior Publication Data
US 2011/0246835 A1   Oct. 6, 2011

(51) Int. Cl.
*G06F 11/00* (2006.01)
(52) U.S. Cl. ............... 714/39; 714/26; 714/33
(58) Field of Classification Search .......... 714/39, 714/33, 26
See application file for complete search history.

(56) References Cited

U.S. PATENT DOCUMENTS

| | | | | |
|---|---|---|---|---|
| 5,822,743 A * | 10/1998 | Gupta et al. | ...... | 706/50 |
| 6,430,712 B2 * | 8/2002 | Lewis | ...... | 714/47.3 |
| 6,795,935 B1 * | 9/2004 | Unkle et al. | ...... | 714/37 |
| 6,966,015 B2 * | 11/2005 | Steinberg et al. | ...... | 714/47.2 |
| 7,069,480 B1 * | 6/2006 | Lovy et al. | ...... | 714/57 |
| 7,082,554 B2 * | 7/2006 | Wilson et al. | ...... | 714/43 |
| 7,107,185 B1 | 9/2006 | Yemini et al. | | |
| 7,188,201 B2 | 3/2007 | Harima et al. | | |
| 7,251,584 B1 * | 7/2007 | Perazolo et al. | ...... | 702/183 |
| 7,257,744 B2 * | 8/2007 | Sabet et al. | ...... | 714/56 |
| 7,389,444 B2 * | 6/2008 | Ma et al. | ...... | 714/26 |
| 7,409,593 B2 * | 8/2008 | Aaron | ...... | 714/26 |
| 7,516,025 B1 * | 4/2009 | Williams et al. | ...... | 702/57 |
| 7,668,953 B1 * | 2/2010 | Sinclair et al. | ...... | 709/224 |
| 7,701,859 B2 * | 4/2010 | Belkin et al. | ...... | 370/242 |
| 7,702,955 B2 * | 4/2010 | de Almeida et al. | ...... | 714/10 |
| 8,171,344 B2 * | 5/2012 | Watanabe et al. | ...... | 714/37 |
| 8,230,269 B2 * | 7/2012 | Yan et al. | ...... | 714/47.1 |
| 2003/0149919 A1 * | 8/2003 | Greenwald et al. | ...... | 714/43 |
| 2004/0078683 A1 * | 4/2004 | Buia et al. | ...... | 714/37 |
| 2004/0254762 A1 * | 12/2004 | Hopkins et al. | ...... | 702/182 |
| 2005/0096953 A1 * | 5/2005 | Washington et al. | ...... | 705/7 |
| 2005/0222813 A1 * | 10/2005 | Bjornson | ...... | 702/183 |
| 2005/0256961 A1 * | 11/2005 | Alon et al. | ...... | 709/229 |
| 2005/0262233 A1 * | 11/2005 | Alon et al. | ...... | 709/223 |
| 2006/0120292 A1 * | 6/2006 | Yardeni et al. | ...... | 370/241 |

(Continued)

*Primary Examiner* — Loan L. T. Truong
(74) *Attorney, Agent, or Firm* — Foley & Lardner LLP

(57) ABSTRACT

An operation management system 12 alleviates the burden on an administrator 103 who carries out reappearance monitoring of a failure that occurred in a computer system 11. The operation management system 12 detects one or more detected events occurring in the computer system 11, and selects a first causal laws code 180 included in a causal laws information 168 based on the causal laws information 168 and the detected event. The operation management system 12, in a case where the composition of the computer system 11 has been changed to eliminate the cause of generation of the detected event, selects a second causal laws code 180 included in a post-change causal laws information 168 based on the post-change causal laws information 168 and the first causal laws code 180, and notifies the administrator 103 of information related to the selected second causal laws code 180.

8 Claims, 23 Drawing Sheets

U.S. PATENT DOCUMENTS

| | | | |
|---|---|---|---|
| 2007/0186195 A1* | 8/2007 | Ng et al. | 716/4 |
| 2008/0004841 A1* | 1/2008 | Nakamura | 702/186 |
| 2008/0209030 A1* | 8/2008 | Goldszmidt et al. | 709/224 |
| 2009/0094076 A1* | 4/2009 | Reddy | 705/7 |
| 2009/0210745 A1* | 8/2009 | Becker et al. | 714/26 |
| 2010/0023604 A1* | 1/2010 | Verma et al. | 709/221 |
| 2010/0049473 A1* | 2/2010 | Regnard De Lagny et al. | 702/183 |
| 2010/0058112 A1* | 3/2010 | Kim et al. | 714/37 |
| 2010/0083029 A1* | 4/2010 | Erickson et al. | 714/2 |
| 2010/0325493 A1* | 12/2010 | Morimura et al. | 714/39 |
| 2011/0047414 A1* | 2/2011 | Kudo et al. | 714/37 |

\* cited by examiner

FIG.2

CAUSAL LAWS INFORMATION 168 (BEFORE CAUSE ELIMINATION)

| P<br>E | $p_1$ | ... | $p_n$ |
|---|---|---|---|
| $e_1$ | 1 | ... | 0 |
| $e_2$ | 1 | ... | 0 |
| $e_3$ | 1 | ... | 0 |
| ... | ... | ... | ... |
| $e_m$ | 0 | ... | 1 |

FIG.3

SYMPTOMS DEFINITION INFORMATION 169 (BEFORE CAUSE ELIMINATION)

| ID | GENERATION-SOURCE IDENTIFICATION DATA | EVENT TYPE |
|---|---|---|
| $e_1$ | SV1-D1 | E1 |
| $e_2$ | SV2-D1 | E1 |
| $e_3$ | SV3-D1 | E1 |
| ... | ... | ... |

FIG.4

CAUSE DEFINITION INFORMATION 170 (BEFORE CAUSE ELIMINATION)

| ID | GENERATION-SOURCE IDENTIFICATION DATA | EVENT TYPE |
|---|---|---|
| $p_1$ | ST1-L1 | P1 |
| ... | ... | ... |

FIG.8
CAUSAL LAWS INFORMATION 168 (AFTER CAUSE ELIMINATION)

| E \ P | $p_2$ | ... | $p_{n'}$ |
|---|---|---|---|
| $e_1$ | 1 | ... | 0 |
| $e_2$ | 1 | ... | 0 |
| $e_3$ | 1 | ... | 0 |
| ... | ... | ... | ... |
| $e_{m'}$ | 0 | ... | 1 |

FIG.9
SYMPTOMS DEFINITION INFORMATION 169 (AFTER CAUSE ELIMINATION)

| ID (211) | GENERATION-SOURCE DATA ENTRY (212) | EVENT TYPE (213) |
|---|---|---|
| $e_1$ | SV1-D1 | E1 |
| $e_2$ | SV2-D1 | E1 |
| $e_3$ | SV3-D1 | E1 |
| ... | ... | ... |

FIG.10
CAUSE DEFINITION INFORMATION 170 (AFTER CAUSE ELIMINATION)

| ID (221) | GENERATION-SOURCE DATA ENTRY (222) | EVENT TYPE (223) |
|---|---|---|
| $p_2$ | ST2-L1 | P1 |
| ... | ... | ... |

FIG.15

PHYSICAL/LOGICAL ATTRIBUTES RELATION INFORMATION 171
(BEFORE CAUSE ELIMINATION)

| LOGICAL DEVICE 261 | PHYSICAL DEVICE 262 |
|---|---|
| LSV1 | PSV1 |
| LSV2 | PSV2 |
| LSV3 | PSV3 |
| LSV4 | PSV3 |
| LSV3-LD1 | PSV3-PD1 |
| LSV4-LD1 | PSV3-PD1 |
| ... | ... |

FIG.16

PHYSICAL/LOGICAL ATTRIBUTES RELATION INFORMATION 171
(AFTER CAUSE ELIMINATION)

| LOGICAL DEVICE 271 | PHYSICAL DEVICE 272 |
|---|---|
| LSV1 | PSV1 |
| LSV2 | PSV2 |
| LSV3 | PSV4 |
| LSV4 | PSV4 |
| LSV3-LD1 | PSV4-PD1 |
| LSV4-LD1 | PSV4-PD1 |
| ... | ... |

FIG.19

AGGREGATION RELATION DEFINITION INFORMATION 172

| | LOWER-LEVEL DEVICE 281 | HIGHER-LEVEL DEVICE 282 | FUNCTION INTERCHANGE-ABILITY 283 |
|---|---|---|---|
| 284 | D | SV | NO |
| 285 | HBA | SV | NO |
| 286 | HBA_P | HBA | YES |
| 287 | L | ST | NO |
| 288 | FC_P | ST | NO |
| | ... | ... | ... |

FIG.20

CAUSAL LAWS INFORMATION 168 (BEFORE CAUSE ELIMINATION)

| E \ P | $p_1$ | ... | $p_n$ |
|---|---|---|---|
| $e_1$ | 1 | ... | 0 |
| $e_2$ | 1 | ... | 0 |
| ... | ... | ... | ... |
| $e_m$ | 0 | ... | 1 |

FIG.21

SYMPTOMS DEFINITION INFORMATION 169 (BEFORE CAUSE ELIMINATION)

| ID (211) | GENERATION-SOURCE DATA ENTRY (212) | EVENT TYPE (213) |
|---|---|---|
| $e_1$ | SV1-HBA1-HBA_P1 | E3 |
| $e_2$ | SV2-HBA1-HBA_P1 | E3 |
| ... | ... | ... |

FIG.22

CAUSE DEFINITION INFORMATION 170 (BEFORE CAUSE ELIMINATION)

| ID (221) | GENERATION-SOURCE DATA ENTRY (222) | EVENT TYPE (223) |
|---|---|---|
| $p_1$ | ST1-FC_P1 | P3 |
| ... | ... | ... |

FIG.23

CAUSAL LAWS INFORMATION 168 (AFTER CAUSE ELIMINATION)

| E \ P | $p_2$ | ... | $p_{n'}$ |
|---|---|---|---|
| $e_3$ | 1 | ... | 0 |
| $e_2$ | 1 | ... | 0 |
| ... | ... | ... | ... |
| $e_{m'}$ | 0 | ... | 1 |

FIG.24

SYMPTOMS DEFINITION INFORMATION 169 (AFTER CAUSE ELIMINATION)

| ID (211) | GENERATION-SOURCE DATA ENTRY (212) | EVENT TYPE (213) |
|---|---|---|
| $e_2$ | SV2-HBA1-HBA_P1 | E3 |
| $e_3$ | SV1-HBA1-HBA_P2 | E3 |
| ... | ... | ... |

FIG.25

CAUSE DEFINITION INFORMATION 170 (AFTER CAUSE ELIMINATION)

| ID (221) | GENERATION-SOURCE DATA ENTRY (222) | EVENT TYPE (223) |
|---|---|---|
| $p_2$ | ST2-FC_P1 | P3 |
| ... | ... | ... |

FIG.27

CAUSAL LAWS INFORMATION 168 (BEFORE CAUSE ELIMINATION)

| E \ P | $p_1$ | ... | $p_n$ |
|---|---|---|---|
| $e_1$ | 1 | ... | 0 |
| $e_2$ | 1 | ... | 0 |
| $e_3$ | 1 | ... | 0 |
| ... | ... | ... | ... |
| $e_m$ | 0 | ... | 1 |

FIG.28

SYMPTOMS DEFINITION INFORMATION 169 (BEFORE CAUSE ELIMINATION)

| ID (211) | GENERATION-SOURCE DATA ENTRY (212) | EVENT TYPE (213) |
|---|---|---|
| $e_1$ | SV1-D1 | E4 |
| $e_2$ | SV2-D1 | E4 |
| $e_3$ | ST1-FC_P1 | E5 |
| ... | ... | ... |

FIG.29

CAUSE DEFINITION INFORMATION 170 (BEFORE CAUSE ELIMINATION)

| ID (221) | GENERATION-SOURCE DATA ENTRY (222) | EVENT TYPE (223) |
|---|---|---|
| $p_1$ | ST1-L1 | P4 |
| ... | ... | ... |

FIG.30

CAUSAL LAWS INFORMATION 168 (AFTER CAUSE ELIMINATION)

| E \ P | $p_2$ | ... | $p_{n'}$ |
|---|---|---|---|
| $e_1$ | 1 | ... | 0 |
| $e_2$ | 1 | ... | 0 |
| $e_4$ | 1 | ... | 0 |
| ... | ... | ... | ... |
| $e_{m'}$ | 0 | ... | 1 |

FIG.31

SYMPTOMS DEFINITION INFORMATION 169 (AFTER CAUSE ELIMINATION)

| ID (211) | GENERATION-SOURCE DATA ENTRY (212) | EVENT TYPE (213) |
|---|---|---|
| $e_1$ | SV1-D1 | E4 |
| $e_2$ | SV2-D1 | E4 |
| $e_4$ | ST2-FC_P1 | E5 |
| ... | ... | ... |

FIG.32

CAUSE DEFINITION INFORMATION 170 (AFTER CAUSE ELIMINATION)

| ID (221) | GENERATION-SOURCE DATA ENTRY (222) | EVENT TYPE (223) |
|---|---|---|
| $p_2$ | ST2-L1 | P4 |
| ... | ... | ... |

FIG.35

CAUSAL LAWS INFORMATION 168 (BEFORE CAUSE ELIMINATION)

| E \ P | $p_1$ | $p_2$ | ... | $p_n$ |
|---|---|---|---|---|
| $e_1$ | 1 | 0 | ... | 0 |
| $e_2$ | 0 | 1 | ... | 0 |
| ... | ... | ... | ... | ... |
| $e_m$ | 0 | 0 | ... | 1 |

FIG.36

SYMPTOMS DEFINITION INFORMATION 169 (BEFORE CAUSE ELIMINATION)

| ID (211) | GENERATION-SOURCE DATA ENTRY (212) | EVENT TYPE (213) |
|---|---|---|
| $e_1$ | LSV1-LD1 | E2 |
| $e_2$ | LSV2-LD1 | E2 |
| ... | ... | ... |

FIG.37

CAUSE DEFINITION INFORMATION 170 (BEFORE CAUSE ELIMINATION)

| ID (221) | GENERATION-SOURCE DATA ENTRY (222) | EVENT TYPE (223) |
|---|---|---|
| $p_1$ | LSV3-LD1 | P2 |
| $p_2$ | LSV4-LD1 | P2 |
| ... | ... | ... |

FIG.38

CAUSAL LAWS INFORMATION 168 (AFTER CAUSE ELIMINATION)

| E \ P | $p_1$ | $p_2$ | ... | $p_n$ |
|---|---|---|---|---|
| $e_1$ | 1 | 0 | ... | 0 |
| $e_2$ | 0 | 1 | ... | 0 |
| ... | ... | ... | ... | ... |
| $e_m$ | 0 | 0 | ... | 1 |

FIG.39

SYMPTOMS DEFINITION INFORMATION 169 (AFTER CAUSE ELIMINATION)

| 211 | 212 | 213 |
|---|---|---|
| ID | GENERATION-SOURCE DATA ENTRY | EVENT TYPE |
| $e_1$ | LSV1-LD1 | E2 |
| $e_2$ | LSV2-LD1 | E2 |
| ... | ... | ... |

FIG.40

CAUSE DEFINITION INFORMATION 170 (AFTER CAUSE ELIMINATION)

| 221 | 222 | 223 |
|---|---|---|
| ID | GENERATION-SOURCE DATA ENTRY | EVENT TYPE |
| $p_1$ | LSV3-LD1 | P2 |
| $p_2$ | LSV4-LD1 | P2 |
| ... | ... | ... |

MANAGEMENT SERVER AND MANAGEMENT SYSTEM

This application is the National Phase of PCT/JP2009/002319, filed May 26, 2009. The entire content of the foregoing application is incorporated by reference in its entirety.

TECHNICAL FIELD

The present invention relates to management server and management system technology for managing a computer system, and particularly to technology for monitoring the reappearance of a failure.

BACKGROUND ART

Technology for managing a computer system comprising a plurality of machines (computers, storage apparatuses, network apparatuses, and so forth) is known. A system for managing a computer system will be called an "operation management system" below.

For example, Patent Citation 1 discloses an operation management system comprising a function (a root cause analysis (RCA) function) for detecting a failure that occurs in the computer system and identifying the cause of this failure. In the disclosure of Patent Citation 1, the operation management system maintains information (causal laws information) for defining a causal relationship between the cause and the event (error symptom) generated by this cause. Then, in a case where an event occurs in a machine comprising the computer system or in a component mounted to this machine (called "machine et al" below as needed), the operation management system acquires the generated event and identifies the cause based on this acquired event and the causal laws information.

Also, for example, Patent Citation 2 discloses an operation management system comprising a function for recognizing the fact that the configuration of the computer system has changed. In the disclosure of Patent Citation 2, a program for detecting a configuration change is disposed in the respective machines inside the computer system. The operation management system recognizes the configuration change in the computer system by acquiring configuration change-related information from the above-mentioned program.

PRIOR PATENT CITATION

Patent Citation

[Patent Citation 1] U.S. Pat. No. 7,107,185
[Patent Citation 2] U.S. Pat. No. 7,188,201

DISCLOSURE OF INVENTION

Technical Problem

However, the process for handling a failure in a case where a failure has occurred in the computer system is generally carried out in the order of failure detection, cause identification, cause elimination, and reappearance monitoring. As used here, "failure detection" refers to detecting the symptom (that is, the event) of the failure that occurred in the computer system. "Cause identification" refers to examining the symptom of the failure detected via failure detection, and identifying the cause of the failure. "Cause elimination" refers to the administrator eliminating the cause identified via cause identification (and thereby eliminating the failure). "Reappearance monitoring" refers to monitoring the problem machine et al for a fixed period of time in order to reduce the reappearance, during a fixed latency period subsequent to failure elimination, of the failure that has been eliminated or a failure (that is, a secondary failure) caused by the measures (for example, the replacement of a machine et al) taken to eliminate the failure. Examples of reappearance may include the reoccurrence of the same memory defect in a replaced server device subsequent to a memory defect that occurred in the server device having been eliminated by replacing the server device, or software that stops running as a result of a user configuration error at the time the server device was replaced.

The operation management system disclosed in the above-mentioned Patent Literature 1 carries out failure detection and cause identification. That is, this type of operation management system detects an event and identifies the cause of this detected event based on the detected event and the causal laws information. In the meantime, cause elimination is normally carried out by the administrator. That is, the administrator, who has been notified of the cause from the operation management system, carries out the measures required to eliminate this cause (for example, the replacement of the machine et al or the repair of the software). Then, reappearance monitoring is also normally carried out under the management of the administrator based on the knowhow of the administrator. For example, the administrator is able to carry out reappearance monitoring by referring to the causal relationship, included in the causal laws information, between the cause that has been eliminated (called the "eliminated cause" below) and an event that has been generated by this eliminated cause, selecting the machine et al, which is somehow linked to the eliminated cause, as the machine et al to focus attention on, and preferentially monitoring this selected machine et al for the occurrence of the event. Preferentially monitoring the machine et al that is somehow linked to the eliminated cause in this way alleviates the reappearance monitoring burden placed on the administrator.

There may be a case here in which the measure taken for cause elimination involves changing the composition of the computer system (for example, replacing the machine et al). Normally, when a change occurs in the composition of the computer system, the causal laws information is changed to reflect this post-change composition. In a case where a change occurs in the composition of the computer system and the causal laws information is changed like this, a problem arises in that the administrator is not able to readily determine which machine et al should be monitored on a priority basis. This is because, as a result of the causal laws information having been changed, information related to the eliminated cause is often times not included in the post-change causal laws information and information related to the event that occurred due to the eliminated cause may also not be included in the post-change causal laws information, making it difficult to select the machine et al that is somehow linked to the eliminated cause.

Accordingly, an object of the present invention is to alleviate the burden on the administrator who monitors for the reappearance of a failure that occurred in the computer system.

Technical Solution

A management server detects one or more first events that occur in the computer system, and selects a first cause identification code included in an event cause information based on the event cause information and the first event. The management server, in a case where the composition of the computer system has been changed to eliminate the cause that generated the first event, selects a second cause identification code included in the post-change event cause information based on the post-change event cause information and the first cause identification code, and notifies the administrator of the information related to the selected second cause identification code.

Furthermore, the "event cause information" is information that includes a cause identification code for each symptom event set. The "symptom event set" is a combination of one or more symptoms and events. A "cause event" is an event that is the cause. A "symptom event" is an event that causes the cause event.

In a case where the composition of the computer system has been changed to eliminate the cause that generated the first event, the content of the event cause information is changed. For example, the management server is able to select as the second cause identification code, from among the cause identification codes included in the post-change event cause information, a cause identification code in which this symptom event set matches the symptom event set of the first cause identification code.

The process performed by the management server in accordance with the present invention may be carried out by a processor inside the management computer executing a computer program. The computer program may be installed from a remote server, or may be installed from a storage medium (for example, a CD-ROM, DVD (Digital Versatile Disk), or other such portable storage medium). Furthermore, at least one part of the management server process may be realized using a hardware circuit.

BRIEF DESCRIPTION OF DRAWINGS

FIG. 2 is a diagram showing an example of causal laws information.

FIG. 3 is a diagram showing an example of symptoms definition information.

FIG. 4 is a diagram showing an example of cause definition information.

FIG. 8 is a diagram showing causal laws information after cause elimination in the first example.

FIG. 9 is a diagram showing the symptoms definition information after cause elimination in the first example.

FIG. 10 is a diagram showing the cause definition information after cause elimination in the first example.

FIG. 15 is a diagram showing physical/logical attributes-related information before cause elimination.

FIG. 16 is a diagram showing physical/logical attributes-related information after cause elimination.

FIG. 19 is a diagram showing an example of aggregation relation definition information.

FIG. 20 is a diagram showing causal laws information before cause elimination in the third example.

FIG. 21 is a diagram showing symptoms definition information before cause elimination in the third example.

FIG. 22 is a diagram showing cause definition information before cause elimination in the third example.

FIG. 23 is a diagram showing causal laws information after cause elimination in the third example.

FIG. 24 is a diagram showing symptoms definition information after cause elimination in the third example.

FIG. 25 is a diagram showing cause definition information after cause elimination in the third example.

FIG. 27 is a diagram showing causal laws information before cause elimination in a fourth example.

FIG. 28 is a diagram showing symptoms definition information before cause elimination in the fourth example.

FIG. 29 is a diagram showing cause definition information before cause elimination in the fourth example.

FIG. 30 is a diagram showing causal laws information after cause elimination in the fourth example.

FIG. 31 is a diagram showing symptoms definition information after cause elimination in the fourth example.

FIG. 32 is a diagram showing cause definition information after cause elimination in the fourth example.

FIG. 35 is a diagram showing causal laws information before cause elimination in the second example.

FIG. 36 is a diagram showing symptoms definition information before cause elimination in the second example.

FIG. 37 is a diagram showing cause definition information before cause elimination in the second example.

FIG. 38 is a diagram showing causal laws information after cause elimination in the second example.

FIG. 39 is a diagram showing symptoms definition information after cause elimination in the second example.

FIG. 40 is a diagram showing cause definition information after cause elimination in the second example.

EXPLANATION OF REFERENCE

Figure 1:
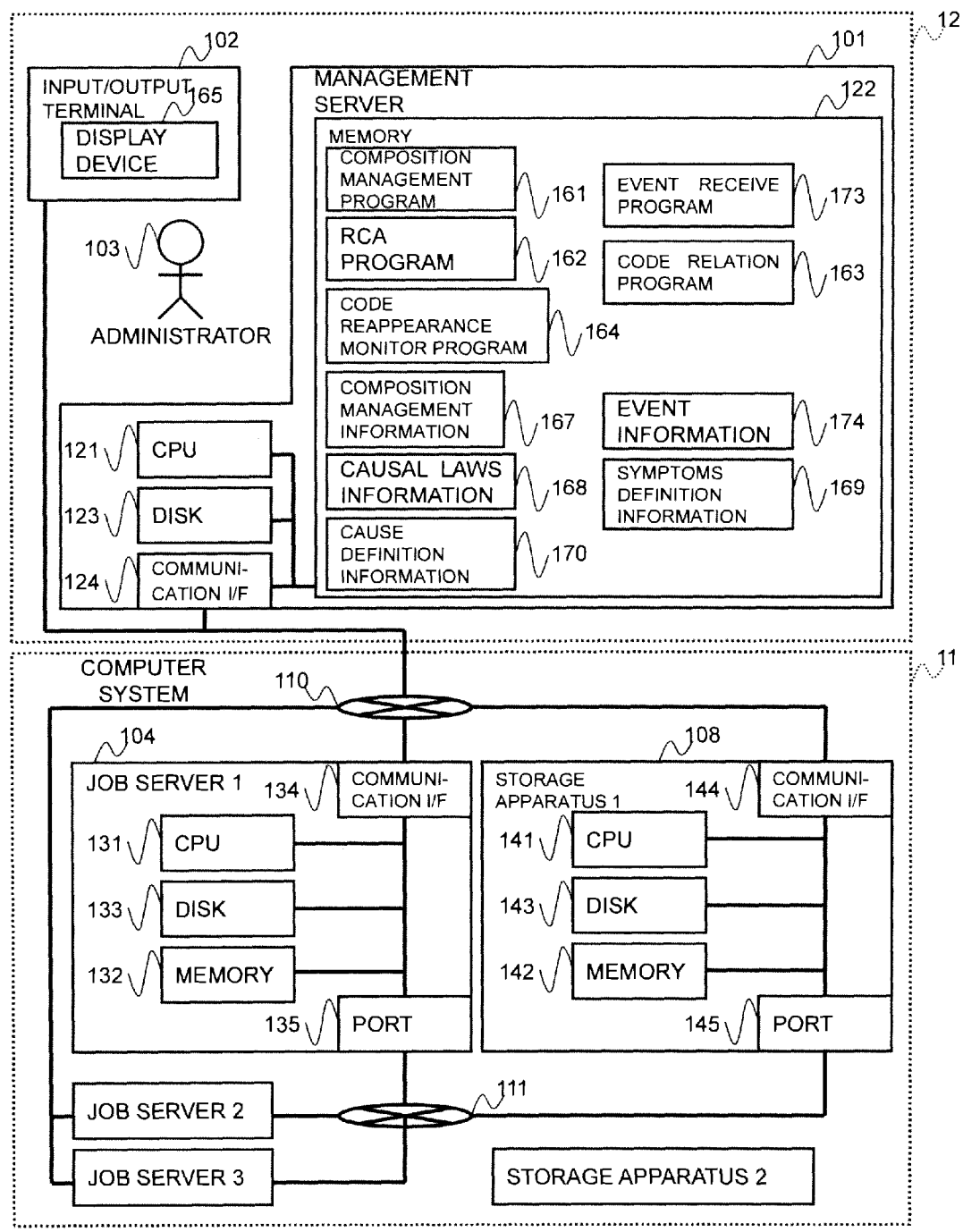
FIG. 1 is a diagram showing an example of the overall composition of an information processing system related to a first example.

11 . . . Computer system
101 . . . Management server
102 . . . Input/output terminal
103 . . . Administrator
104 . . . Job server
108 . . . Storage apparatus
110 . . . Communication network
111 . . . SAN
112 . . . Virtual server
121, 131, 141 . . . CPU 122, 132, 142 . . . Memory
123, 133, 143 . . . Disk
124, 134, 144 . . . Communication interface
135, 145 . . . Ports
137 . . . HBA
161 . . . Composition management program
162 . . . RCA program
163 . . . Code relation program
164 . . . Code reappearance monitor program
165 . . . Display device
166 . . . Server virtualization program
167 . . . Composition management information
168 . . . Causal laws information
169 . . . Symptoms definition information
170 . . . Cause definition information
171 . . . Physical/logical attributes relation information
172 . . . Aggregation relation definition information

BEST MODE FOR CARRYING OUT THE INVENTION

A number of examples of the present invention will be explained below while referring to the drawings.

Furthermore, in the following explanation, information will be denoted using expressions like "xxx table", "xxx list", "xxx DB", and "xxx queue". However, information may also be expressed in forms other than data structures, such as a table, a list, a DB, and a queue. In order to show that information is not dependent on a data structure, "xxx table", "xxx list", "xxx DB", and "xxx queue" may be called "xxx information". Further, when explaining the content of the information, there may be cases in which expressions such as "identification information", "identifier", "name" and "ID" will be used, and these terms are interchangeable.

Also, in the following explanation, there may be cases in which the term computer program is used as the subject of an explanation, but in actuality, the stipulated process will be performed by a processor (typically a microprocessor) executing the program. A storage resource, such as a memory, and a communication port (communication control device) may also be used at this time. The processor may also be the subject when explaining a process carried out by the processor executing the program. A process, which is explained using the program as the subject, may also be a process performed by the computer. Further, either a part or all of a program may be realized in accordance with dedicated hardware.

The program may also be installed in the computer from a program source, such as a program distribution server or a storage medium.

Mode for the Invention 1

FIG. 1 is a diagram showing an example of the overall configuration of an information processing system 1 related to a first example.

The information processing system 1, for example, comprises a computer system 11, and an operation management system 12. In this example, the computer system 11, for example, comprises one or more job servers 104, one or more storage apparatuses 108, and one or more network apparatuses (not shown in the drawing) for configuring either a communication network 110 or a SAN (Storage Area Network) 111. Below, the machines (job server 104, storage apparatus 108, and network apparatus) comprising the computer system 11 will be called node devices. The computer system 11, for example, may also have a printer and file server as node devices in addition to the job server 104 and storage apparatus 108. The job server 104 and storage apparatus 108, for example, are coupled by way of the SAN 111. The operation management system 12 is for managing the computer system 11. The operation management system 12, for example, comprises a management server 101, and an input/output terminal 102. The management server 101 and the input/output terminal 102, for example, are coupled by way of the communication network 110. Furthermore, the SAN 111 coupling scheme, for example, uses FC (Fibre Channel), but a coupling scheme other than FC (for example, iSCSI) may also be used. The communication network 110 and the SAN 111 may also be the same network.

The job server 104, for example, comprises a CPU (Central Processing Unit) 131, a memory 132, a disk 133, a communication I/F (interface) 134, and a port 135. The storage apparatus 108, for example, comprises a CPU 141, a memory 142, a disk 143, a communication I/F 144, and a port 145. The disk 133 of the job server 104 will be called the "server disk" below, and the disk 143 of the storage apparatus 108 will be called the "storage disk". Although not shown in the drawing, a LU (Logical Unit) is created in the storage apparatus 108 based on a storage area of the storage disk 143.

The management server 101, for example, is coupled to the respective node devices via the communication network 110. The management server 101 carries out the various processes described below (for example, a process for analyzing the cause of a failure) based on a variety of information acquired from the node devices (for example, information denoting an event that has occurred in the node device), and notifies the result of this processing to an administrator 103. The administrator 103 refers to the notified processing result, and carries out the operational management of the computer system 11 (for example, failure elimination, reappearance monitoring, and so forth).

The management server 101, for example, comprises a CPU 121, a memory 122, a disk 123, and a communication I/F 124. The memory 122 of the management server 101, for example, stores a composition management program 161, a RCA program 162, a code relation program 163, a code reappearance monitor program 164, and an event receive program 173. Further, the memory 122 of the management server 101, for example, also stores composition management information 167, causal laws information 168, cause definition information 169, symptoms definition information 170, and event information 174 in addition to the various programs mentioned above. Furthermore, the memory 122 may be either a volatile memory or a nonvolatile memory, and a storage area on the disk 123 may be used as either a part or all of the memory 122 storage area.

Furthermore, the management server 101 may also comprise an input/output device. The input/output device, for example, is a display, a keyboard, or a pointer device. Further, an interface device (for example, a serial interface or an Ethernet interface) may also be used as the input/output device. In accordance with this, the relevant interface device is coupled to a display computer, display information is sent to the display computer, and input/output information is received from the display computer. In this example, the input/output terminal 102 serves the role of the above-mentioned display computer, and substitutes for the input and the display of the above-mentioned input/output device.

In this example, the operation management system 12 is comprised of the management server 101 and the input/output terminal 102, but this system 12 is not necessarily limited to a composition like this. For example, in a case where the management server 101 itself comprises an input/output device, the operation management system 12 does not need to have the input/output terminal 102, and the same processing as that of the management server 101 may be realized via a plurality of computers for increasing the speed and enhancing the reliability of the management process, and in accordance with this, the relevant plurality of computers (including the display computer as well when the display computer carries out a display) comprise the management system 12.

The information stored in the memory 122 of the operation management system 12 and the processing carried out by the operation management system 12 will be explained in detail below. First, an explanation of the key terminology used in this example and other examples below will be explained.

(1) Monitoring Target Object:

Refers to the object that the operation management system 12 is targeting for management from among the either physical or logical devices that exist on the computer system 11. The either physical or logical device that exists on the computer system 11 here, for example, may include the node device (that is, a machine comprising the computer system 11, such as the job server 104, the storage apparatus 108 or the network apparatus), a component mounted to the node device (such as the server disk 133, storage disk 143, or ports 135, 145), a logical device created inside the node device (for example, a LU created in the storage apparatus 108), and a functional module realized on the node device by executing a computer program.

(2) Data Model:

Refers to a model of a monitoring target object provided for making it possible to manage various data related to the monitoring target object ("object data") on the computer. The data model, for example, is expressed combining data items of object data.

As used here, object data, for example, comprises data showing the attribute of the monitoring target object, and data showing the relationship between monitoring target objects (coupling relation, dependence relation, or inclusive relation). Then, for example, in a case where the monitoring target object is the job server 104 or the storage apparatus 108, the attribute of the monitoring target object comprises the ID of the job server 104 or the like, the name of the job server 104 or the like, and the IP address that has been allocated to the job server 104 or the like. Further, for example, in a case where the monitoring target object is a network device (for example, a switch device) comprising either the communication network 110 or the SAN 111, the attribute of the monitoring target object will comprise the network device ID or the number of ports that the network device possesses.

(3) Data Entry:

Refers to the data created in accordance with the data model for each monitoring target object. That is, a combination of the respective values (values related to the targeted monitoring target object) of the data items that define the data model is the data entry. For example, in a case where the data model is expressed as a combination of the monitoring target object ID, the IP address and the ID of the device having a dependence relation, the data entry related to the storage apparatus 1 in FIG. 1 becomes the combination of the storage apparatus 1 ID (for example, "ST1"), the IP address allocated to the storage apparatus 1, and the respective IDs (for example, "SV1", "SV2" and "SV3) of the devices that have a dependence relation with the storage apparatus 1 (that is, the job server 1, the job server 2, and the job server 3).

The management server 101, by referring to the data entry, is able to know the monitoring target object that exists in the computer system 11, and is able to know the object data of each monitoring target object (that is, the attribute of this device, and its dependence relation with another device).

(4) Event:

Refers to an event that could occur in the monitoring target object. In this example, it is supposed that the event signifies an event involving a failure. For example, an event such as "data cannot be read out from inside the storage disk", or an event such as "the data read out from the storage disk has been corrupted" is the event.

(5) Event Model:

Refers to a model of the event provided for making it possible to manage various data related to the event (called the "event data" below) on the computer. The event model for example, is expressed as a combination of data items of event data.

Here, event data, for example, comprises the event ID, the event type, the time the event occurred, and the location where the event occurred (that is, the monitoring target object in which the event occurred). The event type, for example, may include a "server disk failure", a "storage disk failure" or a "communication I/F failure". The above-mentioned events "data cannot be read out from inside the storage disk" and "the data read out from the storage disk has been corrupted" are both classified as a "storage disk failure". Furthermore, event data may also comprise the type of the location where the event occurred (that is, the type of the monitoring target object in which the event occurred). The type of the location where the event occurred, for example, may include "job server", "storage apparatus", "server disk" and "storage disk". The job servers 1, 2 and 3 in FIG. 1 are each classified as a "job server".

(6) Event Entry:

Refers to data created in accordance with the event model for a certain event (either an event that has actually occurred, or an event that could occur). That is, a combination of the respective values (the values related to the targeted event) of the data items that define the event model is the event entry. For example, in a case where the event model is expressed as a combination of the event ID, the event type and the location where the event occurred, the event entry of the event (regarded as event A) in which "data cannot be read out from inside the storage disk", which has either occurred or could occur in the storage disk 143 of the storage apparatus 1, becomes the combination of the event A ID, the "storage disk failure", which is the type of the event A, and data (for example, "ST1-D2") showing the storage disk 143 of the storage apparatus 1, which is the location where the event A occurred.

Furthermore, in the explanations of this example and the other examples, it is supposed that the event and the event entry related to this event are furnished with respectively corresponding names. For example, in a case where the event name is "event A", the name of the event entry related to event A will be "event entry A".

(7) Event Propagation Model:

Refers to a model that uses the event model (in particular, a model that is expressed as a combination of the event type and the type of the location where the event occurred (a model expressed as the event type in a case where the event type is also capable of identifying the location where the event occurred)) to define a propagation relation between events. In the event propagation model, for example, a propagation relation, such as the "storage disk failure" propagates to the "server disk failure", is defined.

Furthermore, of the above-mentioned definitions, the "xxx model" and "xxx entry" were named on the assumption that they were developed in accordance with either an object oriented language or a development environment (that is, the "xxx model" is equivalent to a "class", and the "xxx entry" is equivalent to an "instance"), but the implementation format is not limited to this. The "xxx entry" is specific information that accords with the "xxx model", and as such, the object data regarding the device, component or program corresponding to the data entry may be stored in the memory 122 of the management server 101.

First, the various information 167, 168, 169, 170 and 174 stored in the memory 122 of the management server 101 will be explained.

The composition management information 167 refers to information showing the composition of the computer system 11, that is, information showing which node devices comprise the computer system 11, how each node device is comprised (for example, what component is mounted to the node device), what the coupling relation between the node devices and between the components is like, and what the inclusive relation between the node device and the component is like. The composition of the node device comprises the physical attribute of the node device (a serial number or MAC (Media Access Control) address), the logical attribute of the node device (the IP address or performance information), and the composition of the component inside the node device.

In this example, since a group of data entries respectively related to the monitoring target object that exists on the computer system 11 shows the composition of the computer system 11, the above-mentioned data entry group is used as the composition management information 167.

The event information 174 is information comprising one or more event entries related to the event that occurred in the computer system 11. The event information 174, for example, is updated as follows. That is, when an event occurs in a certain node device, this node device creates an event entry related to the event that occurred, and sends the created event entry to the management server 101. The event receive program 173 of the management server 101 updates the event information 174 by adding the event entry received from the node device to the event information 174. Furthermore, instead of the method that updates the event information 174 at the timing at which the event entry was received from the node device as described above, the event receive program 173 may carry out processing as follows. That is, the event receive program 173, either regularly or irregularly, queries the respective node devices as to whether or not an event has occurred (whether or not an event entry has been created), and in a case where the event entry has been created, may acquire this created event entry and add it to the event information 174. Further, the exchange of the event entry between the management server 101 and the respective node devices may be carried out via the communication network 110, or may be carried out via storage media.

FIG. 2 is a diagram showing an example of the causal laws information 168.

The causal laws information 168 is information showing the relationship between one or more events and the cause in a case in which these one or more events have occurred. The cause is also a kind of event. Accordingly, an event which is the cause of an event that has occurred will be called the "cause event". Further, a combination of events that occur having the cause event as the cause will be called the "symptom event set". In addition, the respective events that belong to the symptom event set will be called the "symptom event". The symptom event is an event that occurs having the cause event as the cause.

The causal laws information 168, for example, is expressed in a matrix format as shown in FIG. 2. Column item 201 lists the IDs (e1, e2, e3, . . . em) of the events (called the "symptom event candidate" below) capable of becoming symptom events. Further, row item 204 lists the IDs (p1, . . . pn) of the cause events. Each value in the matrix shows whether or not the symptom event candidate of the corresponding column item 201 is the symptom event for the cause event of the corresponding row item 204. In this example, the symptom event candidate having a value of "1" is the symptom event.

Each row in the causal laws information 168 shows one causal relation between the symptom event (symptom event set) and the cause event. For example, the row corresponding to cause event p1 in FIG. 2 shows that the value corresponding to each of the symptom event candidates e1, e2, and e3 is "1", and that each of the symptom event candidates e1, e2, and e3 is a symptom event for the cause event p1 (the values of the portions in the drawing marked " . . . " are all "0". The same holds true below.). That is, in a case where the symptom events e1, e2, and e3 occur, it is concluded that p1 is the cause event. The data that shows this single causal relation (data comprising the value of each row, and the ID of the cause event corresponding to this row) 180 will be called the "causal laws code". In this example, the content of the causal laws code 180 is expressed as "[symptom event ID1, symptom event ID2 . . . ]→cause event ID". In a case where this expression method is used, the causal laws code 180 shown by the row corresponding to the cause event p1 in FIG. 2 is expressed as "[e1, e2, e3]→p1".

FIG. 3 is a diagram showing an example of the symptoms definition information 169.

The symptoms definition information 169 comprises event entries respectively related to events (symptom event candidates) listed as the column items 201 of the causal laws information 168. In the example of FIG. 3, each row shows one event entry. Each event entry, for example, comprises a corresponding symptom event candidate ID 211, the event type 213 of the corresponding symptom event candidate, and data (called "generation-source identification data" below) 212 for identifying the monitoring target object in which the corresponding symptom event candidate occurred (called the "generation source" below).

FIG. 4 is a diagram showing an example of the cause definition information 170.

The cause definition information 170 comprises event entries respectively related to the cause events listed as the row items 204 of the causal laws information 168. In the example of FIG. 4, each row shows a single event entry the same as FIG. 3, and each event entry, for example, comprises a corresponding cause event ID 221, an event type 223 of the corresponding cause event, and generation-source identification data 222 of the corresponding cause event. Furthermore, the above-mentioned causal laws information, symptoms definition information, and cause definition information may be of any data structure, and may be integrated together as one piece of information. Further, the expression format of the above-mentioned causal laws information, symptoms definition information, and cause definition information may express a cause with respect to one or more symptoms in accordance with a rule format.

The processing performed by the operation management system 12 will be explained below.

The composition management program 161 acquires the required information by using SNMP (Simple Network Management Protocol) or the API (Application Programming Interface) provided by each node device, and creates the composition management information 167. In a case where the composition of the computer system 11 changes, the composition management program 161 updates the contents of the composition management information 167 so that it corresponds to the post-update composition.

Figure 5:
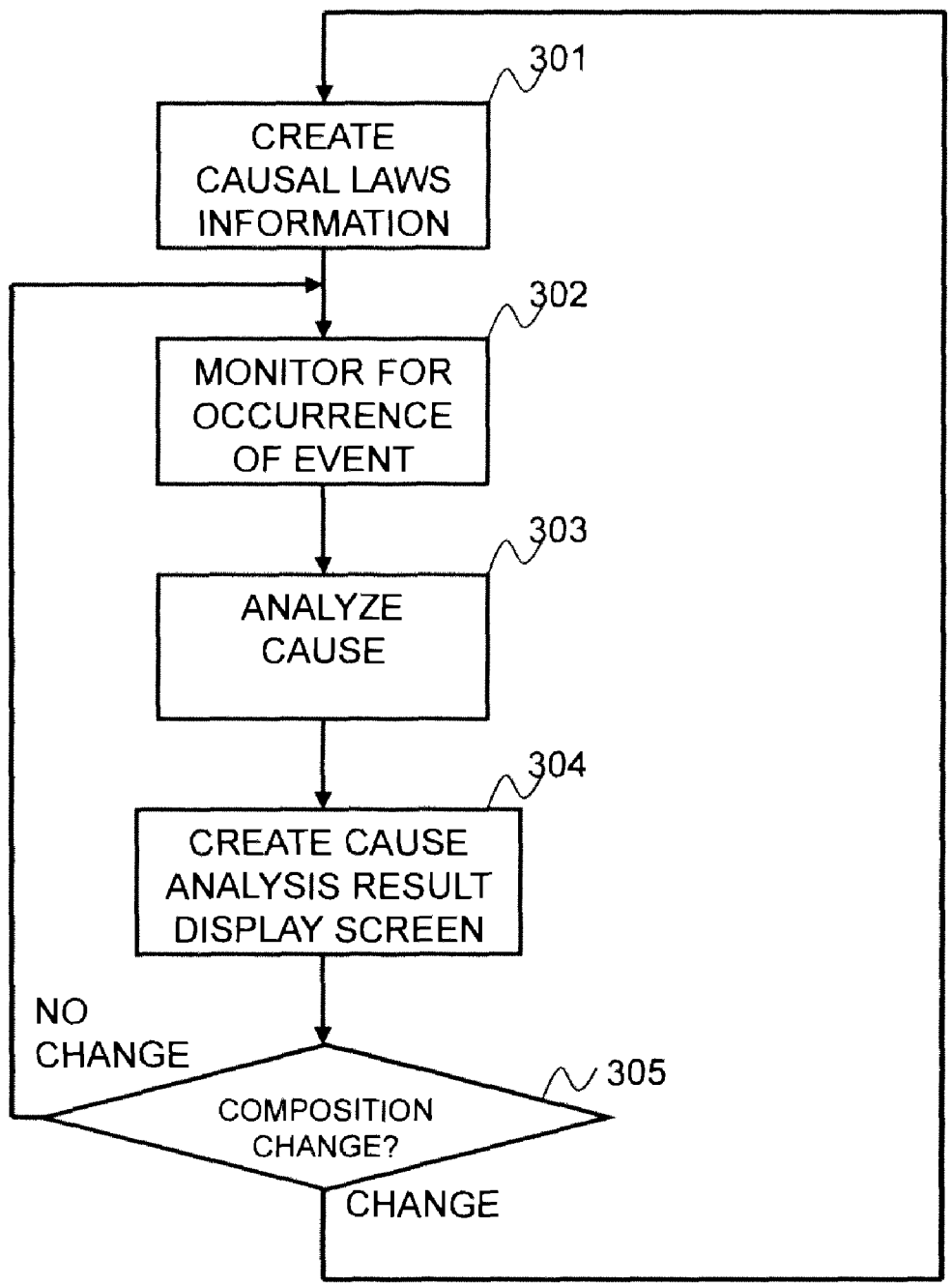
FIG. 5 is a flowchart of the processing performed by an RCA program.

FIG. 5 is a flowchart of the processing carried out by the RCA program.

When the RCA program 162 is booted up, the RCA program 162 first of all creates the causal laws information 168, the symptoms definition information 169, and the cause definition information 170 based on the event model, the event propagation model and the composition management information 167 (S301).

Thereafter, the RCA program 162 monitors for an event occurring inside the computer system 11 by checking the event information 174 updates at all times (S302).

When an event occurs inside the computer system 11 (in this example, when an event occurs in the monitoring target object), the event receive program 173 receives the event entry of this event that occurred. Then, the event receive program 173 adds the received event entry to the event information 174.

When the event information 174 is updated, the RCA program 162 acquires the event entry that was added anew to the event information 174. In accordance with this, the RCA program 162 detects the event that occurred in the computer system 11. For example, the RCA program 162 is able to acquire as the newly added event entry one or more of a plurality of event entries included in the event information 174 (for example, event entries that have been added from a predetermined time in the past until the present). The combination of the one or more events (events respectively shown by the above-mentioned acquired one or more event entries) detected by the RCA program 162 will be called the "detected event set". Further, each of the one or more events detected by the RCA program 162 will be called the "detected event". That is, the detected event is an event belonging to the detected event set.

Next, the RCA program 162 identifies a root cause of a failure that occurred in the computer system 11 by referring to the causal laws information 168 and analyzing the cause of the detected event (S303). Specifically, the RCA program 162 determines whether or not this symptom event set matches the detected event set for each of the causal laws codes 180 included in the causal laws information 168. The determination as to whether or not the symptom event set matches the detected event set here is carried out by determining whether or not the events belonging to the combination (the corresponding events) match. Also, a determination as to whether or not the symptom event matches the detected event is carried out by determining whether or not either a part or all of the information of the respectively related event entries (for example, the generation-source identification data and event type) match. Then, the RCA program 162 concludes that the cause event of the causal laws code 180 (called the "ignited code" below) in which this symptom event set matched the detected event set is the root cause of the failure that occurred in the computer system 11.

Of the cause events listed in the row item 204 of the causal laws information 167, the event that was actually determined to be the cause (that is, the cause event of the ignited code) will be called the "concluded cause event" below. Further, the symptom event set that matches the detected event set (that is, the symptom event set of the ignited code) will be called the "detected symptom event set". In addition, each of the events belonging to the detected symptom event set (that is, the symptom event of the ignited code) will be called the "detected symptom event". That is, the concluded cause event is concluded to be the root cause of the failure in accordance with all of the events belonging to the detected symptom event set (detected symptom events) having occurred in the computer system 11.

Thereafter, the RCA program 162 collects the various information needed to create a screen for notifying the cause of the failure to the administrator 103 (called the "cause analysis result display screen" below), and creates the cause analysis result display screen based on this collected information (S304). Then, the RCA program 162 sends the created cause analysis result display screen to the input/output terminal 102. The input/output terminal 102 that receives the cause analysis result display screen displays the received cause analysis result display screen on a display device 165. Furthermore, in addition to displaying the cause analysis result display screen on the input/output terminal 102, the RCA program 162 may also notify the administrator 103 by e-mail or phone to the effect that the cause of the failure has been identified. The cause analysis result display screen will be explained here by referring to FIG. 6.

Figure 6:
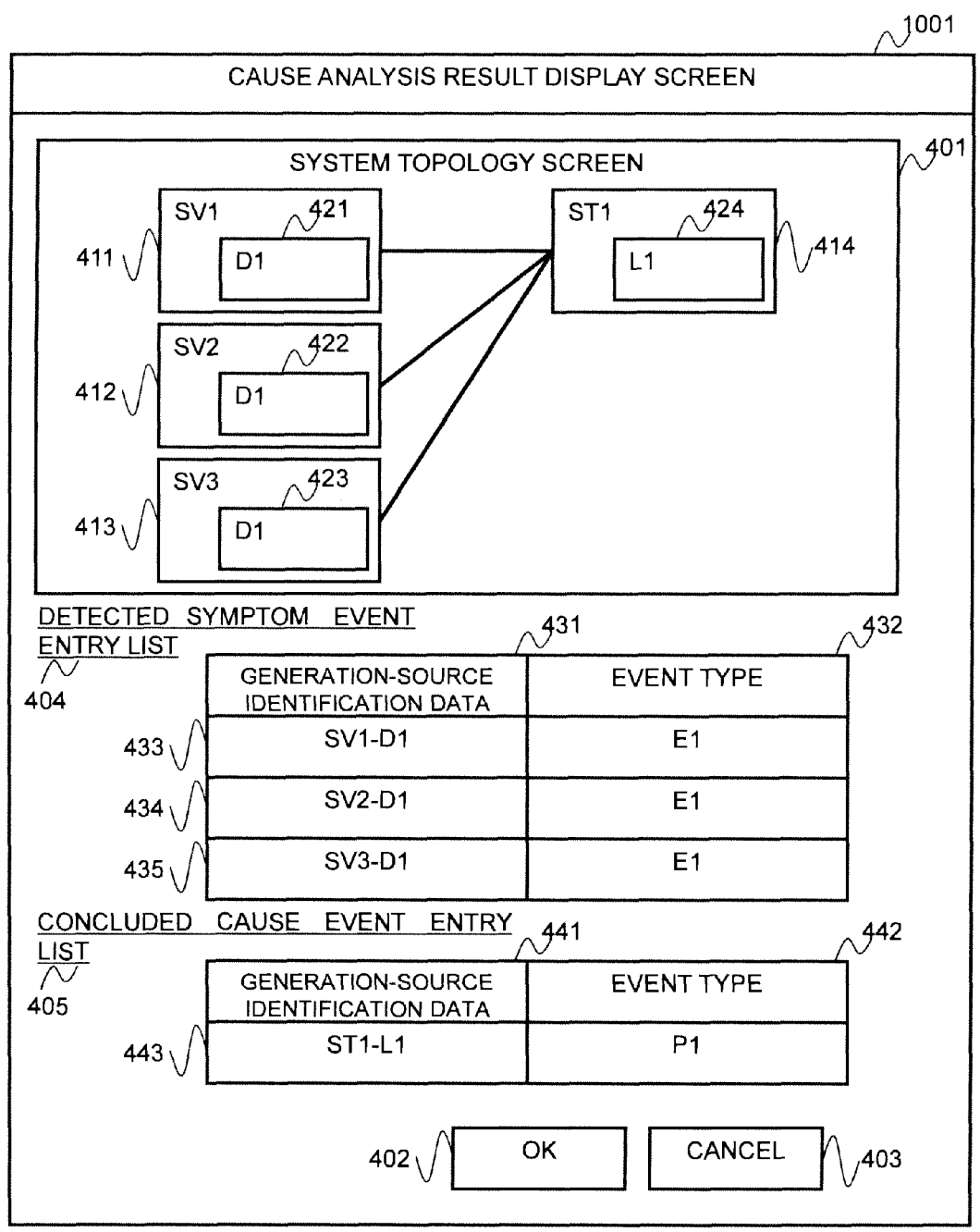
FIG. 6 is a diagram showing an example of a screen for displaying the result of cause analysis.

FIG. 6 is a diagram showing an example of the cause analysis result display screen 1001.

In the cause analysis result display screen 1001, for example, there is disposed a system topology display area 401, a display area 404 for a list of detected symptom event entries, and a display area 405 for a list of concluded cause event entries. Further, the cause analysis result display screen 1001 is also provided with an OK button 402 and a CANCEL button 403. The administrator 103 is able to use these buttons 402, 403 to select whether or not to move the failure handling process from cause identification to cause elimination.

The coupling relation of the monitoring target object related to the ignited code is displayed in the system topology display area 401. The monitoring target object related to the ignited code here refers respectively to the ignited code symptom event (that is, the detected symptom event) generation source (the monitoring target object shown in the generation-source identification data 212 of the detected symptom event entry), and the ignited code cause event (that is, the concluded cause event) generation source (the monitoring target object shown in the generation-source identification data 222 of the concluded cause event entry). Therefore, the system topology display area 401 displays the coupling relation between the generation source of the detected symptom event and the generation source of the concluded cause event. This coupling relation is obtained by referring to the composition management information 167. Furthermore, for example, the system topology display area 401 also displays the monitoring target object, which has an inclusive relation with the generation source of the detected symptom event or the generation source of the concluded cause event (that is, in a case where the generation source is the storage disk 143, the storage apparatus 108 to which this is mounted).

The detected symptom event entry list display area 404 displays either a part or all of the information included in this event entry for each of one or more of the detected symptom event entries (in this example, the generation-source identification data 431 and the event type 432).

The concluded cause event entry list display area 405 displays either a part or all of the information included in the concluded cause event entry (in this example, the generation-source identification data 441 and the event type 442).

Refer to FIG. 5 once again. Thereafter, the RCA program 162 determines whether or not the composition of the computer system 11 has changed (S305).

In a case where the composition of the computer system 11 has changed (S305: Change), the RCA program 162 performs processing of Step S301. That is, the RCA program 162 creates the causal laws information (that is, the post-cause elimination causal laws information) 168 corresponding to the post-change composition. The pre-cause elimination causal laws information 168 is normally deleted from the memory 122 at this point. For example, the ignited code, which is included in the pre-cause elimination causal laws information 168, is stored in the memory 122 at this time.

By contrast, in a case where the composition of the computer system 11 has not changed (S305: No Change), the RCA program 162 carries out the processing of Step S302. That is, the RCA program 162 monitors the event generated in the computer system 11 once again without changing the causal laws information 168.

Furthermore, upon detecting a composition change in the computer system 11, the composition management program 161 updates the composition management information 167, and is also able to notify the RCA program 162 to the effect that the composition has been updated. Upon receiving the notification to the effect that the above-mentioned composition has changed, the RCA program 162 may determine that the composition of the computer system 11 has changed, and may carry out the processing of Step S301.

The preceding has been an explanation of the processing carried out by the RCA program 162. In accordance with this processing, failure detection and cause identification are performed in the failure handling process. Then, the administrator, who grasps the cause in accordance with the cause analysis result display screen 1001, carries out the processing needed to eliminate the cause. In this example, it is supposed that a process by which a change occurs on the composition of the computer system 11 (for example, the replacement of the storage apparatus 1) is adopted as the process for eliminating the cause.

The operation management system 12 related to this example is able to alleviate the burden of reappearance monitoring on the administrator 103 by determining the target object or event to be monitored on a priority basis during reappearance monitoring, monitoring for the presence or absence of a failure reappearance candidate based thereon, and notifying the administrator 103 of this information in a case where a reappearance candidate is found. The above-mentioned process for alleviating the burden on the administrator 103 for reappearance monitoring is carried out by the code relation program 163 and the code reappearance monitor program 164.

Figure 7:
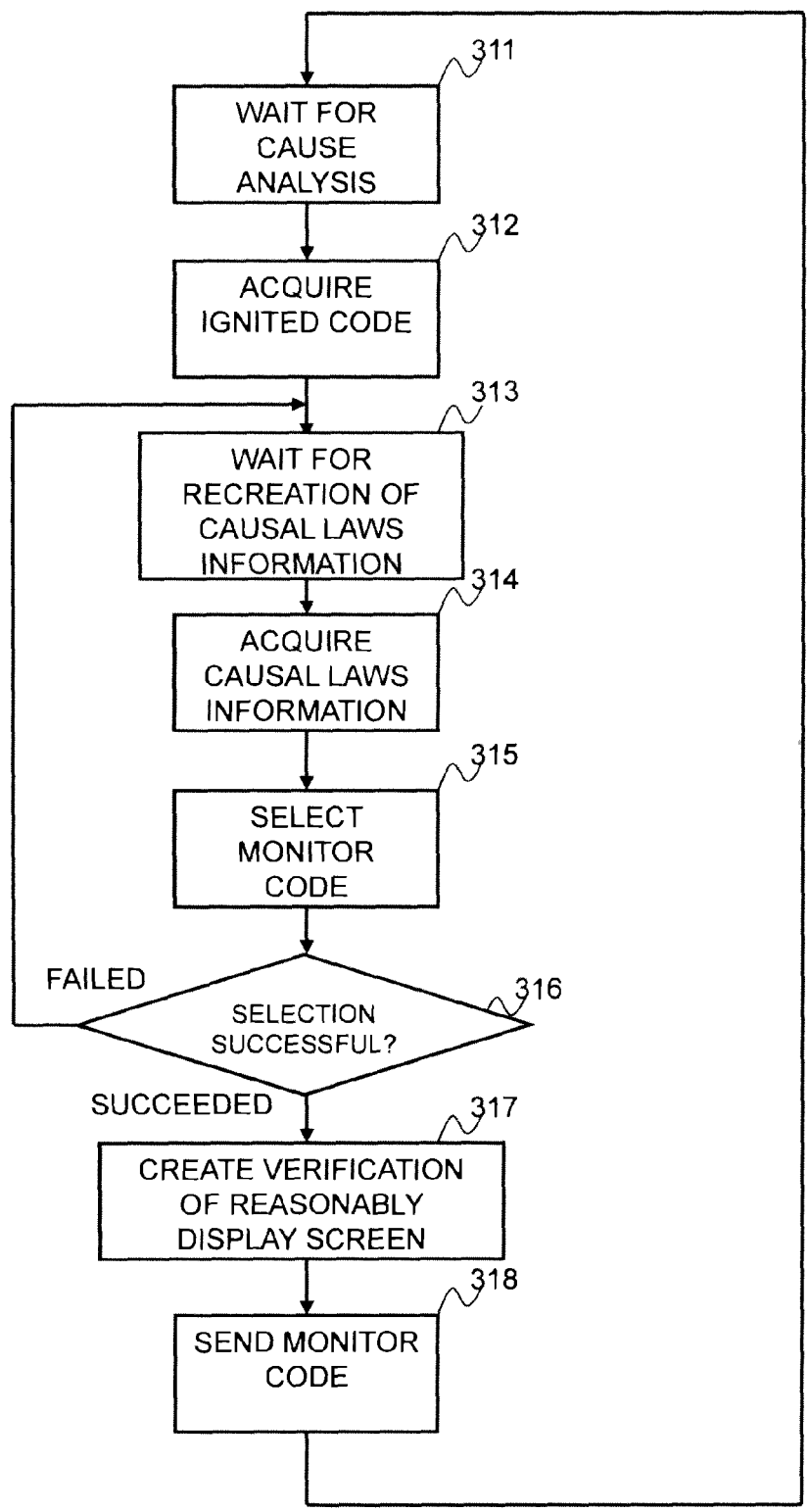
FIG. 7 is a flowchart for the processing performed by a code relation program.

FIG. 7 is a flowchart of the processing carried out by the code relation program 163.

The code relation program 163, subsequent to being booted up, stands by until the RCA program 162 concludes the cause event in Step S303 of FIG. 5 (S311).

As for the code relation program 163, when the RCA program 162 concludes the cause event, the code relation program 163 acquires the ignited code (the causal laws code 180 comprising the cause event that has been concluded (that is, the concluded cause event)) from the RCA program 162 (S312). Then, the code relation program 163 once again stands by until the RCA program 162 creates the post-cause elimination causal laws information 168 (S313).

When the post-cause elimination causal laws information 168 has been created, the code relation program 163 receives the post-cause elimination causal laws information 168 from the RCA program 162 (S314).

Thereafter, the code relation program 163 selects from the post-cause elimination causal laws information 168 acquired in Step S314 the causal laws code 180 related to the ignited code acquired in Step S312 (S315). The causal laws code 180 related to the ignited code, which was selected from the post-cause elimination causal laws information 168, will be called the "monitor code" below. Further, the cause event of the monitor code will be called the "monitoring cause event". In addition, the symptom event set of the monitor code will be called the "monitoring symptom event set", and the symptom event of the monitor code (that is, the event belonging to the monitoring symptom event set) will be called the "monitoring symptom event".

The monitor code is used as information for selecting the monitoring target object or event to be monitored on a priority basis. In this example, the monitoring cause event becomes the event to be monitored on a priority basis. Further, the monitoring symptom event, the generation source of the monitoring cause event and the generation source of the monitoring symptom event respectively attached thereto are also monitored on a priority basis. That is, the operation management system 12 (code reappearance monitor program 164) perceives the occurrence of the monitoring cause event as the reappearance of the failure, and monitors for the occurrence of the monitoring symptom event in order to monitor for the presence or absence of the failure reappearance candidate.

For example, from among the causal laws codes 180 included in the post-cause elimination causal laws information 168, the code relation program 163 is able to select as the monitor code the causal laws code 180 for which this symptom event set matches the symptom event set of the ignited code. The determination here as to whether or not the event sets match, as described above, is carried out by determining whether or not the events belonging to the event sets (the corresponding events) match. Then, the determination as to whether or not the events match is carried out by determining whether or not either a part or all of the information of the event entries related thereto (for example, the generation-source identification data and the event type) match.

The reason the causal laws code 180 for which this symptom event set matches the detected symptom event set is selected as the monitor code like this is based, for example, on the fact that when a pre-replacement machine has been providing a function of some sort to another machine, and the post-replacement machine will most likely also provide the same function to the above-mentioned other machine. In other words, in a case where the detected symptom event has occurred in the above-mentioned other machine, it is conceivable that the reason this detected symptom event occurred (that is, the reason for the event having propagated) was because of the function provision relation. Then, in a case where the post-replacement machine also provides the same function as the pre-replacement machine and the same event as the cause event, which occurred in the pre-replacement machine, has occurred in the post-replacement machine, this is due to the possibility that this event will propagate and that the detected symptom event that occurred prior to cause elimination will occur in the above-mentioned other machine.

Thereafter, the code relation program 163 determines whether or not the monitor code was able to be selected (S316).

In a case where the monitor code was not able to be selected (S316: Failed), the code relation program 163 carries out the processing of Step S313. That is, the code relation program 163 stands by until the post-cause elimination causal laws information 168 has been created.

By contrast, in a case where the monitor code was able to be selected (S316: Succeeded), the code relation program 163 collects the various information needed to create the screen (called the "verification of reasonably display screen" below) for verifying the reasonableness of the cause elimination to the administrator 103, and, based on this collected information, creates the verification of reasonably display screen (S317). Then, the code relation program 163 sends the created verification of reasonably display screen to the input/output terminal 102. The input/output terminal 102, which receives the verification of reasonably display screen, displays the received verification of reasonably display screen on the display device 165. Furthermore, the same as in the case of the above-described the cause analysis result display screen 1001, in addition to displaying the verification of reasonably display screen on the input/output terminal 102, the code relation program 163 may also notify the administrator 103 by e-mail or phone to the effect that preparations for verifying the reasonableness of the cause elimination have been made. The verification of reasonably display screen will be explained later by referring to FIG. 11.

Thereafter, the code relation program 163 notifies the monitor code to the code reappearance monitor program 164 (S318), and once again stands by in Step S311.

Figure 11:
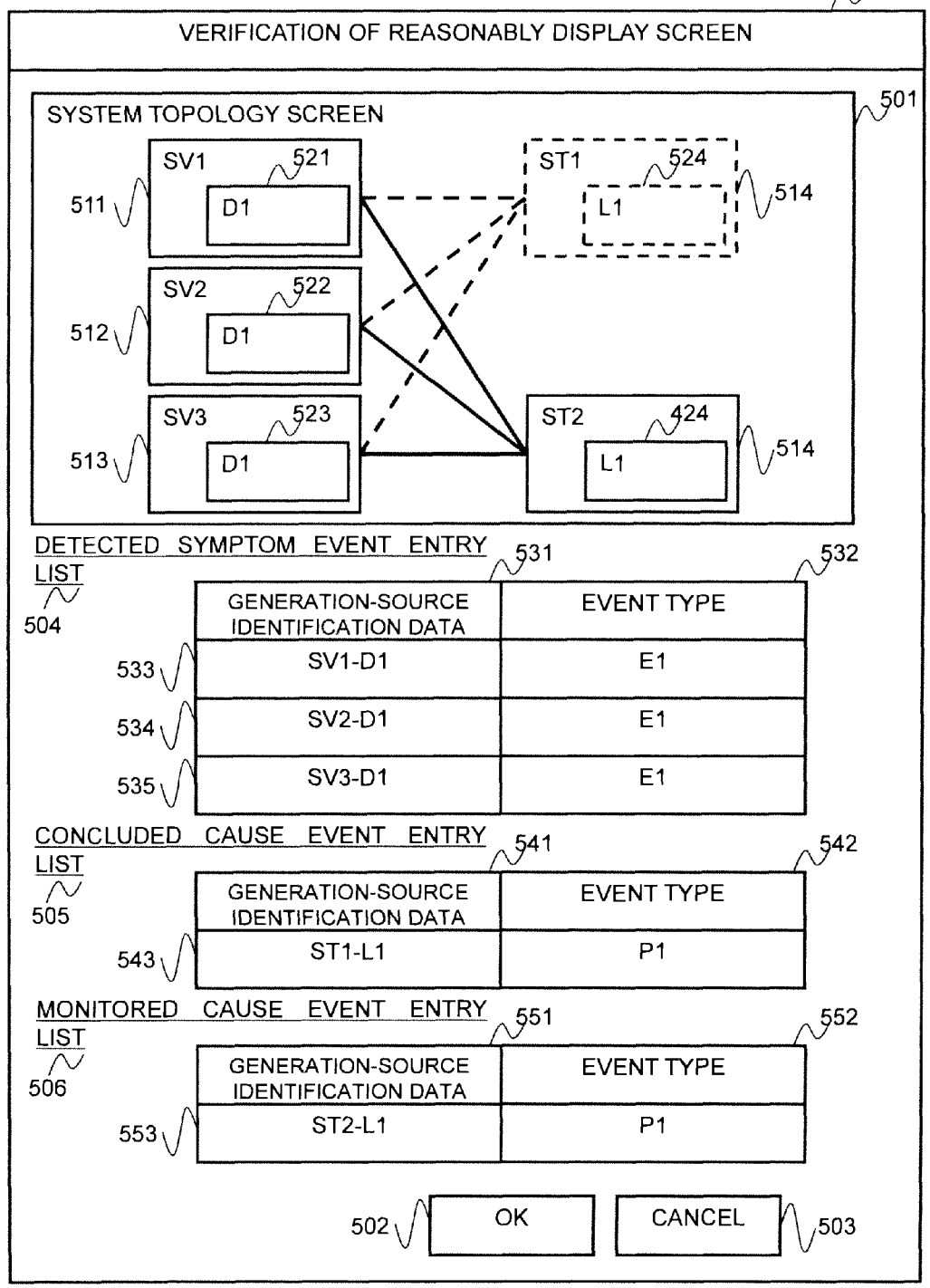
FIG. 11 is a diagram showing an example of a screen for displaying a verification of reasonably.

FIG. 11 is a diagram showing an example of the verification of reasonably display screen 1002.

In the verification of reasonably display screen 1002, for example, there is provided a system topology display area 501, a display area 504 for a list of detected symptom event entries, a display area 505 for a list of concluded cause event entries, and a display area 506 for a list of monitored cause event entries. Further, the verification of reasonably display screen 1002 is also provided with an OK button 502 and a CANCEL button 503. The administrator 103 is able to use these buttons 502, 503 to select whether or not the failure handling process will proceed to reappearance monitoring.

Information, which is displayed respectively in the detected symptom event entry list display area 504 and the concluded cause event entry list display area 505 of these display areas, is substantially the same as the information displayed in the cause analysis result display screen 1001.

The system topology display area 501 displays the coupling relation of each of the monitoring target object related to the ignited code and the monitoring target object related to the monitor code. The monitoring target object related to the ignited code here, as described above, refers to the generation source of the detected symptom event and the generation source of the concluded cause event, respectively. Further, the monitoring target object related to the monitor code refers respectively to the monitor code symptom event (that is, the monitored symptom event) generation source (the monitoring target object shown in the generation-source identification data 212 of the monitored symptom event entries) and the monitor code cause event (that is, the monitored cause event) generation source (the monitoring target object shown in the generation-source identification data 222 of the monitored cause event entries). Furthermore, since the monitored symptom event and the detected symptom event match, they have the same generation source. For example, in the system topology display area 501, the monitoring target object related to the ignited code (that is, the pre-failure elimination one) is rendered using a dotted line, and the monitoring target object related to the monitor code (that is, the post-failure elimination one) is rendered using a solid line. Displaying these monitoring target objects like this makes it possible for the administrator to easily understand how the monitoring target objects have changed in accordance with the elimination of the failure.

The monitored cause event entry list display area 506 displays either a part or all of the information included in the monitored cause event entry (in this example, the generation-source identification data 551 and the event type 552). By viewing the display area 506, the administrator is able to learn information related to the monitored cause event, which is regarded as the event to be monitored on a priority basis.

Figure 12:
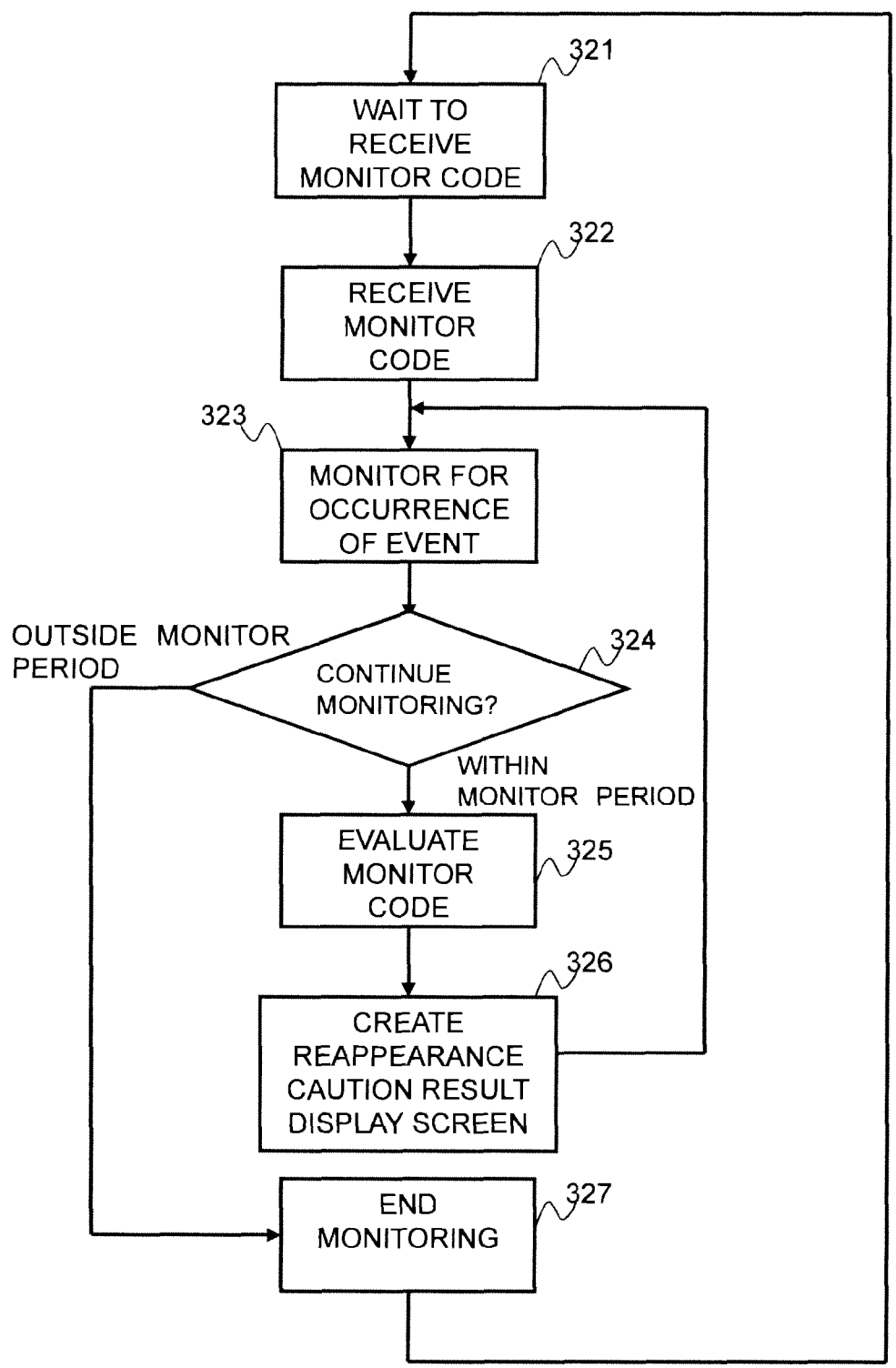
FIG. 12 is a flowchart of the processing performed by a code reappearance monitor program.

FIG. 12 is a flowchart of the processing carried out by the code reappearance monitor program 164.

The code reappearance monitor program 164, subsequent to being booted up, stands by until being notified of the monitor code by the code relation program 163 (S321).

The code reappearance monitor program 164 receives the monitor code in accordance with the code relation program 163 executing the processing of Step S318 in FIG. 7 (S322).

Thereafter, the code reappearance monitor program 164 monitors for an event occurring inside the computer system 11 by checking the updating of the event information 174 at all times (S323). This event monitoring is continued until a predetermined monitoring period (for example, a fixed period from the point in time at which the operation management system 12 detects the elimination of the cause) has elapsed.

Furthermore, the event monitoring carried out by this code reappearance monitor program 164 is carried out using the same method as the event monitoring that the RCA program 162 carries out in Step S302 of FIG. 5. That is, when an event occurs inside the computer system 11, an event entry related to this event is added to the event information 174, and the code reappearance monitor program 164 detects the event that occurred in the computer system 11 by acquiring this added event entry from the event information 174. The combination of one or more events detected by the code reappearance monitor program 164 will be called the "event set at reappearance monitoring" below. Further, each of the one or more events detected by the code reappearance monitor program 164 (that is, the events belonging to the event set at reappearance monitoring) will be called the "event at reappearance monitoring".

In a case where an event is detected prior to the passage of the monitoring period (S324: Within Monitoring Period), the code reappearance monitor program 164 determines whether or not there is a reappearance candidate based on the event entry at reappearance monitoring (the event entry acquired from the event information 174) and the monitor code received in Step S322. Specifically, for example, the code reappearance monitor program 164 is able to determine that a reappearance candidate exists in a case where the event set at reappearance monitoring and the monitored symptom event set (monitor code symptom event set) match at least partially (for example, a case in which any of the events at reappearance monitoring match any of the monitored symptom events). The monitored symptom event that matches with any of the events at reappearance monitoring, that is, the monitored symptom event that has reappeared will be called the "reappearance symptom event" below.

In a case where a reappearance candidate is determined to exist, the code reappearance monitor program 164 collects the various information needed to create a screen (will be called the "reappearance caution result display screen" below) for notifying the reappearance candidate to the administrator 103, and creates this reappearance caution result display screen based on this collected information (S326). Then, the code reappearance monitor program 164 sends the created reappearance caution result display screen to the input/output terminal 102. The input/output terminal 102, which receives the reappearance caution result display screen, displays the received reappearance caution result display screen on the display device 165. Furthermore, the same as in the cases of the cause analysis result display screen 1001 and the verification of reasonably display screen 1002 described above, in addition to displaying the reappearance caution result display screen on the input/output terminal 102, the code reappearance monitor program 164 may notify the administrator 103 via e-mail or phone to the effect that a reappearance candidate exists. The reappearance caution result display screen will be explained later by referring to FIG. 13.

In a case where the predetermined monitoring period has elapsed (S324: Outside Monitoring Period), the code reappearance monitor program 164 ends the reappearance monitoring (S327). Thereafter, the processing of Step 321 is carried out once again. Furthermore, the code reappearance monitor program 164 is able to notify the administrator 103 that the predetermined monitoring period has elapsed.

Figure 13:
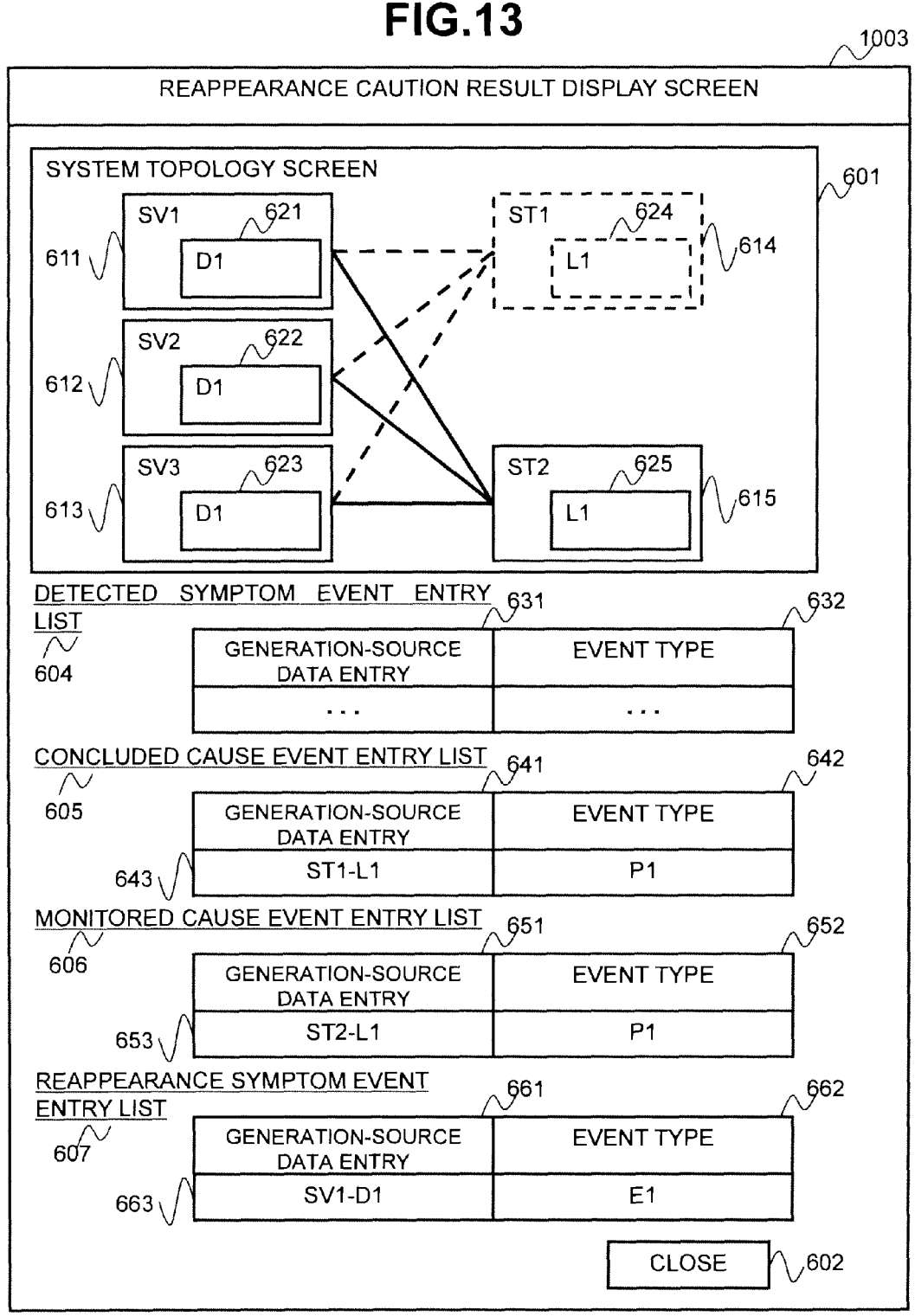
FIG. 13 is a diagram showing an example of a screen for displaying the result of a reappearance caution.

FIG. 13 is a diagram showing an example of the reappearance caution result display screen 1003.

In the reappearance caution result display screen 1003, for example, there is disposed a system topology display area 601, a display area 604 for a list of detected symptom event entries, a display area 605 for a list of concluded cause event entries, a display area 606 for a list of monitored cause event entries, and a display area 607 for a list of reappearance symptom event entries.

Information, which is displayed respectively in the system topology display area 601, the detected symptom event entry list display area 604, the concluded cause event entry list display area 605 and the monitored cause event entry list display area 606 of these display areas, is substantially the same as the information displayed in the verification of reasonably display screen 1002.

The reappearance symptom event entry list display area 607 displays either a part or all of the information included in the event entry for each of the one or more reappearance symptom event entries (in this example, the generation-source identification data 661 and the event type 662). The administrator is able to learn about information related to the event (reappearance symptom event), which was the basis of the determination that a reappearance candidate exists, by viewing the display area 607.

The preceding has been explanations of the processing carried out by the code relation program 163 and the code reappearance monitor program 164.

Next, the processing of the operation management system 12, which has been explained up to this point, will be explained using the series of scenarios (A1) through (D1) below. Furthermore, the following scenarios are merely examples, and do not purport to limit the applicable scope of this example thereto.

(A1) As shown in FIG. 1, the administrator 103 uses the management server 101 to operate and manage the computer system 11, to which three job servers 104 (job server 1, job server 2 and job server 3) and one storage apparatus 108 (storage apparatus 1) are coupled. The data used respectively by the job servers 1, 2, and 3 here is stored in the storage disk 143 of the storage apparatus 1. Further, the fact that a "storage disk failure" in the storage apparatus 108 propagates to a "server disk failure" in the job server 104 that uses this storage apparatus 108 is defined in the event propagation model.

(B1) Subsequent to the start of operation, a server disk 133 failure event occurs in the server disk 133 of each of the job servers 1, 2, and 3 caused by the failure in the storage disk 143 of the storage apparatus 1. The server disk 133 failure event that occurs in the server disk 133 of each of the job server 1, the job server 2, and the job server 3 will respectively be called a "server disk failure event 1", a "server disk failure event 2", and a "server disk failure event 3" below. The RCA program 162, which detects the server disk failure events 1, 2 and 3, carries out the processing of FIG. 5, concludes that the cause event is the event in which the storage disk 143 of the storage apparatus 1 failed (called the "storage disk failure event 1" below), and identifies the fact that the cause of the failure lies in the storage disk 143 of the storage apparatus 1.

(C1) The administrator 103, who learns of the cause of the failure from the cause analysis result display screen 1001, replaces the storage apparatus 1 with a storage apparatus 2 that differs from the storage apparatus 1 to eliminated the cause, and performs the configuration of the storage apparatus 2 so that the respective job servers 1, 2, and 3 are able to access the storage disk 143 of the storage apparatus 2.

(D1) Since there was an error in the configuration of the storage disk 143 of the storage apparatus 2 after the passage of several hours from the cause elimination in accordance with (C1) above, the server disk failure event 1 reappeared in the server disk 133 of the job server 1. The administrator 103, who recognizes a reappearance candidate from the reappearance caution result display screen 1003, readjusts the storage apparatus 2. Thereafter, due to the passage of the predetermined monitoring period following the cause elimination in accordance with (C1) above, the code reappearance monitor program 163 notifies the administrator 103 that reappearance monitoring has ended.

The first example will be explained more specifically in accordance with the scenario (A1) through (D1) described above.

After the start of the computer system 11 operation in FIG. 1, the administrator 103 respectively boots up the event receive program 173, the composition management program 161, the RCA program 162, the code relation program 163 and the code reappearance monitor program 164 on the management server 101.

The RCA program 162 creates the various information of FIGS. 2 through 4 by executing the Step S301 of FIG. 5. That is, FIGS. 2 through 4 show the pre-cause elimination causal laws information 168, the symptoms definition information 169, and the cause definition information 170.

As used here, "SV1-D1", "SV2-D1", and "SV3-D1" in FIG. 3 refer respectively to the generation-source identification data denoting the server disk 133 of the job server 1, the generation-source identification data denoting the server disk 133 of the job server 2, and the generation-source identification data denoting the server disk 133 of the job server 3. Further, "E1" signifies the event type "server disk failure". Therefore, the events e1, e2, and e3 respectively signify the server disk failure event 1, the server disk failure event 2, and the server disk failure event 3. The "ST1-L1" in FIG. 4 is the generation-source identification data denoting the storage disk 143 of the storage apparatus 1. "P1" signifies the event type "storage disk failure". Therefore, the event p1 signifies the storage disk failure event 1.

Thereafter, the RCA program 162 detects the server disk failures 1, 2 and 3, and identifies the cause by referring to the causal laws information 168. As shown in FIG. 2, a causal laws code "[e1, e2, e3]→p1" is included in the causal laws information 168 here. Therefore, since the server disk failure events 1, 2 and 3 match the symptom event set (e1, e2, e3), the cause event p1 (that is, the storage disk failure event 1) is concluded to be the root cause. Furthermore, the above-mentioned causal laws code "[e1, e2, e3]→p1" is the ignited code. Then, an event entry related to the storage disk failure event 1 is displayed in the concluded cause event entry list display area 405 in the cause analysis result display screen 1001.

Thereafter, the administrator, who found out the cause in accordance with the cause analysis result display screen 1001, carries out the processing of the above-mentioned scenario (C1) in order to eliminate the cause.

When the cause has been eliminated and the composition of the computer system 11 has been changed, the RCA program 162 creates causal laws information 168 corresponding to the post-change composition. FIGS. 8 through 10 respectively show the post-cause elimination causal laws information 168, the symptoms definition information 169, and the cause definition information 170. Furthermore, in FIG. 10, "ST2-L1" is the generation-source identification data denoting the storage disk 143 of the storage apparatus 2. The event in which the storage disk 143 of the storage apparatus 2 fails will be called the "storage disk failure event 2" below. That is, the event p2 signifies the storage disk failure event 2.

As is clear from FIG. 8, the ignited code ("[e1, e2, e3]→p1") does not exist in the pre-cause elimination causal laws information 168, and instead, there exists the ignited code ("[e1, e2, e3]→p2"). This is because the storage apparatus 1 was replaced with the storage apparatus 2, and the storage disk 143 of the storage apparatus 2 is being used instead of the storage disk 143 of the storage apparatus 1.

Thereafter, the code relation program 163 selects the ignited code "[e1, e2, e3]→p2" as the monitor code because the symptom event set of the ignited code ("[e1, e2, e3]→p1") matches the symptom event set of the ignited code "[e1, e2, e3]→p2" included in the post-cause elimination causal laws information 168. That is, the combination of the events e1, e2, and e3 is the monitored symptom event set, and the event p2 is the monitored cause event. Then, an event entry related to the storage disk failure event 2, which is the monitored cause event, is displayed in the display area 506 of the verification of reasonably display screen 1002.

Thereafter, as described in the above-mentioned scenario (D1), the server disk failure event 1 is detected during reappearance monitoring as the event at reappearance monitoring. The code reappearance monitor program 164 determines that a reappearance candidate exists because the server disk failure event 1 is the monitored symptom event. Then, the code reappearance monitor program 164 displays the reappearance caution result display screen 1003 on the display device 165. An event entry related to the storage disk failure event 2, which is the monitored cause event, is displayed in the display area 606 of the reappearance caution result display screen 1003 the same as it is in the display area 506 of the verification of reasonably display screen 1002. Further, an event entry related to the server disk failure event 1, which is the reappearance symptom event, is displayed in the display area 607 of the reappearance caution result display screen 1003.

Thereafter, the administrator, who recognizes the reappearance candidate in accordance with the reappearance caution result display screen 1003, deals with this reappearance candidate by readjusting the storage apparatus 2.

According to the first example described above, the causal laws code 180 related to the ignited code is selected from the post-cause elimination causal laws information 168 as the monitor code. The operation management system 12 notifies the information related to the monitor code to the administrator 103, and also monitors for the presence or absence of a failure reappearance candidate by regarding the occurrence of a monitored cause event as the reappearance of the failure, and monitoring for the occurrence of the monitored symptom event. Then, in a case where any of one or more monitored symptom events occurs, the operation management system 12 determines that a reappearance candidate has appeared and notifies the administrator 103 to this effect. In accordance with this, the burden placed on the administrator 103 for reappearance monitoring is alleviated.

Mode for the Invention 2

A second example of the present invention will be explained below. In so doing, the points of difference with the first example will mainly be explained, and explanations of the points in common with the first example will be simplified or omitted.

Figure 14:
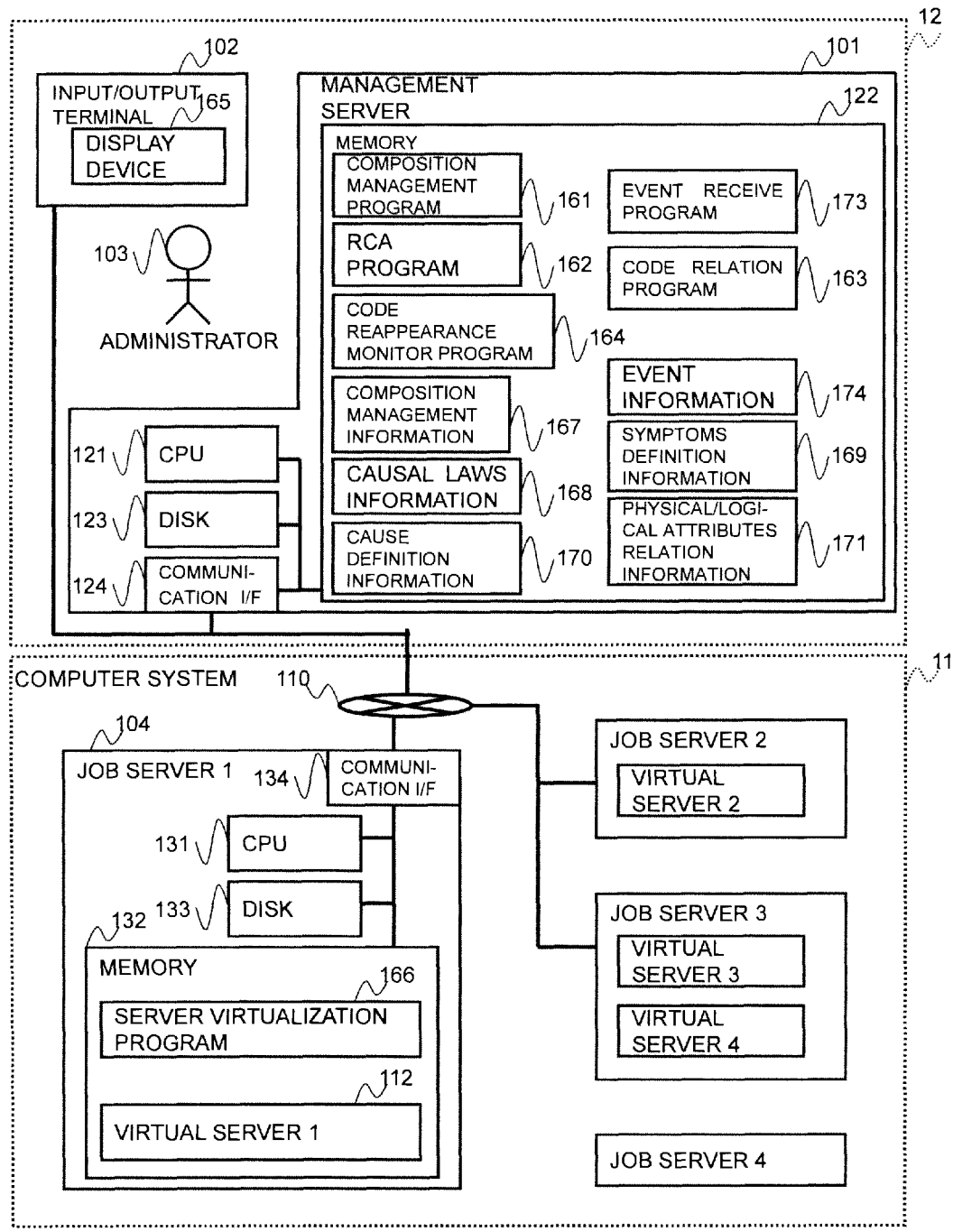
FIG. 14 is a diagram showing an example of the overall composition of an information processing system related to a second example.

FIG. 14 is a diagram showing an example of the overall composition of an information processing system 1 related to the second example.

A server virtualization program 166, which is a computer program (for example, VMware (registered trademark)) for running a virtual server 112, is stored in the memory 132 of the job server 104. Executing the server virtualization program 166 runs a virtual server 112 on the job server 104. Furthermore, although not shown in the drawing, the virtual server 112 virtually comprises a CPU, a memory, a disk, a communication I/F and a port. The disk of the virtual server 112 will be called the "virtual disk" below. The virtual disk is created based on the storage capacity of the server disk 133.

Also physical/logical attributes relation information 171 is stored in the memory 122 of the management server 101. The physical/logical attributes relation information 171 is information showing the relationship between a physical device comprising the job server 104 and a virtual device (the logical device in FIG. 15) comprising the virtual server 112. As shown in FIG. 15, the physical/logical attributes relation information 171 comprises the corresponding relationship between the job server 104 and the virtual server 112 that is running on the job server 104, and the corresponding relationship between the server disk 133 and the virtual disk created based on this server disk 133. In a case where the composition of the computer system 11 has changed, the contents of the physical/logical attributes relation information 171 are updated so as to correspond to the post-change composition.

The processing of the second example is substantially the same as the processing of the first example except for the monitor code selection method (the processing method of Step S315 of FIG. 7). In the second example, the code relation program 163 selects the monitor code by referring to the post-cause elimination physical/logical attributes relation information 171 in addition to the post-cause elimination causal laws information 168 and the ignited code. The method of selecting the monitor code will be described further below.

The second example will be explained using the following series of scenarios (A2) through (C2). Furthermore, the following scenarios are merely examples, and do not purport to limit the applicable scope of this example.

(A2) As shown in FIG. 14, a virtual server 1 is running on the job server 1, a virtual server 2 is running on the job server 2, and a virtual server 3 and a virtual server 4 are running on the job server 3. Then, the virtual disk (called the "virtual disk 1" below) of the virtual server 1 is created by being allocating either part or all of the storage capacity of the virtual disk (called the "virtual disk 3" below) of the virtual server 3. Similarly, the virtual disk (called the "virtual disk 2" below) of the virtual server 2 is created by being allocating either part or all of the storage capacity of the virtual disk (called the "virtual disk 4" below) of the virtual server 4. Then, the fact that a "virtual disk failure" in the allocation-source virtual disk will propagate to a "virtual disk failure" in the allocation-destination virtual disk is defined in the event propagation model.

(B2) After the start of operation, there occurs an event (called the "virtual disk failure event 1" below) in which virtual disk 1 fails due to a failure in virtual disk 3. The RCA program 162, which detects the virtual disk failure event 1, carries out the processing of FIG. 5, concludes that the cause event is the virtual disk 3 failure event (called the "virtual disk failure event 3" below), and identifies the fact that the cause of the failure lies in the server disk 133 of the job server 3, which is basis for virtual disk 3.

(C2) The administrator 103, who learns about the cause of the failure in accordance with the cause analysis result display screen 1001, replaces the job server 3 with the job server 4, which is different from the job server 3, in order to eliminate the cause.

The second example will be explained in detail in accordance with the above scenarios (A2) through (C2).

FIG. 15 shows the pre-cause elimination physical/logical attributes relation information 171. "LSV1", "LSV2", "LSV3", "LSV4", "LSV3-LD1", and "LSV4-LD1", respectively, are identification data denoting the virtual server 1, the virtual server 2, the virtual server 3, the virtual server 4, the virtual disk 3, and the virtual disk 4. Also, "PSV1", "PSV2", "PSV3", and "PSV3-PD1", respectively, are the identification data denoting the job server 1, the job server 2, the job server 3, and the server disk 133 of the job server 3. Therefore, for example, row 263 reveals that the virtual server 1 is running on the job server 1. Further, for example, row 267 reveals that the virtual disk 3 is created on the basis of the storage capacity of the server disk 133 of the job server 3.

The RCA program 162 creates the various information of FIGS. 35 through 37 by executing the Step S301 in FIG. 5. That is, FIGS. 35 through 37 show the pre-cause elimination causal laws information 168, the symptoms definition information 169, and the cause definition information 170 of the second example. In the second example, the event e1 signifies the virtual disk failure event 1, and the event p1 signifies the virtual disk failure event 3.

Thereafter, the RCA program 162 detects the virtual disk failure event 1, and identifies the cause by referring to the causal laws information 168. Here, as shown in FIG. 35, the causal laws information 168 comprises a causal laws code "[e1]→p1". Therefore, since the virtual disk failure event 1 matches the symptom event set (e1), the cause event p1 (that is, the virtual disk failure event 3) is concluded to be the root cause. Furthermore, the above causal laws code "[e1]→p1" is the ignited code. Then, an event entry related to the virtual disk failure event 3 is displayed in the display area 405 of the cause analysis result display screen 1001.

Thereafter, the administrator, who discerns the cause in accordance with the cause analysis result display screen 1001, carries out the measures of the above-mentioned scenario (C2) in order to eliminate the cause.

When the cause has been eliminated and the composition of the computer system 11 has been changed, the physical/logical attributes relation information 171 is updated, and the RCA program 162 creates causal laws information 168 corresponding to the post-change composition.

FIG. 16 shows the post-cause elimination physical/logical attributes relation information 171. Since the job server 3 has been replaced by the job server 4, the "PSV3" is changed to a "PSV4", and the "PSV3-PD1" is changed to a "PSV4-PD1". The "PSV4" and the "PSV4-PD1" here are the identification data denoting the job server 4, and the identification data denoting the server disk 133 of the job server 4, respectively.

Further, FIGS. 38 through 40 respectively show the post-cause elimination causal laws information 168, the symptoms definition information 169 and the cause definition information 170 of the second example. As is clear from FIGS. 35 and 38, the content of the causal laws information 168 is not changed after the cause has been eliminated in the second example. This is because the information related to the virtual device object (the physical device) comprising the virtual server 112 is concealed from the other devices of the management server 101. That is, since there is no change in the composition of the virtual device recognized by the management server 101 even when the physical device has been changed, the content of the causal laws information 168 is the same subsequent to the cause being eliminated.

Thereafter, the code relation program 163 selects the monitor code as follows. That is, first, the code relation program 163 acquires the generation-source identification data (that is, the "LSV3-LD1") denoting the generation source (the virtual disk 3) of the concluded cause event from the event entry related to the concluded cause event (the virtual disk failure event 3). Next, the code relation program 163 refers to the post-cause elimination physical/logical attributes relation information 171 and acquires the identification data of the physical device (called "related physical device" below), which is related to the generation source (the virtual disk 3) of the concluded cause event. Since the virtual disk 3 and the server disk 133 of the job server 4 are associated in the post-cause elimination physical/logical attributes relation information 171 here, the server disk 133 of the job server 4 is regarded as the related physical device, and this identification data (that is, the "PSV4-PD1") is acquired. Then, the code relation program 163 once again refers to the post-cause elimination physical/logical attributes relation information 171 and acquires the identification data of all of the virtual devices (called the "related virtual device" below), which are related to the related physical device (the server disk 133 of the job server 4). In addition to the virtual disk 3 being associated to the server disk 133 of the job server 4 in the post-cause elimination physical/logical attributes relation information 171, the virtual disk 4 and the server disk 133 of the job server 4 are also associated in the post-cause elimination physical/logical attributes relation information 171 here, so that the virtual server 3 and the virtual server 4 are regarded as the related virtual device, and the identification data thereof (that is, the "LSV3-LD1" and the "LSV4-LD1") are acquired. Then, from among the causal laws codes 180 included in the post-cause elimination causal laws information 168, the code relation program 163 selects as the monitor code either a part or all of the causal laws code 180 in which the generation source of this cause event is the related virtual device (in this example, either the virtual disk 3 or the virtual disk 4). That is, the causal laws code "[e1]→p1" and/or "[e2]→p2" is/are selected as the monitor code. By the monitor code being selected like this, even though there is no superficial link (the event propagation relation) with the concluded cause event (p1), the administrator 103 is also able to monitor on a priority basis the event (p2) that has as its generation source the monitoring target object (the virtual disk 4), which is substantially linked via the physical device to the generation source (the virtual disk 3) of the concluded cause event (p1).

Figure 17:
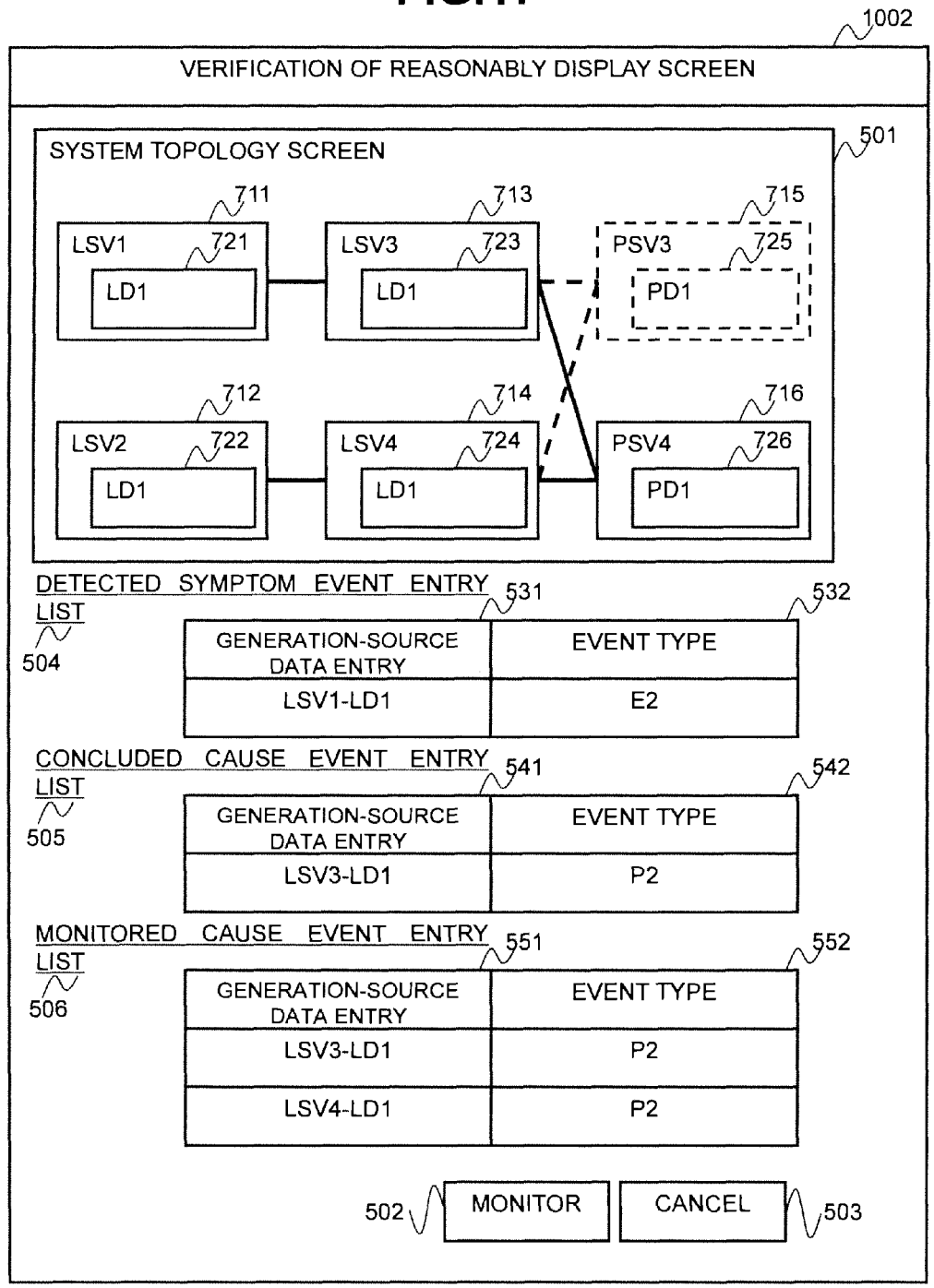
FIG. 17 is a diagram showing an example of the verification of reasonably display screen displayed under the scenario of the second example.

FIG. 17 is a diagram showing an example of the verification of reasonably display screen 1002, which is displayed under the scenarios of the second example.

Similar to the first example, the coupling relations of each of the monitoring target object related to the ignited code and the monitoring target object related to the monitor code are displayed in the system topology display area 501. Further, as shown in FIG. 17, for example, the physical device (the server disk 133 of the b servers 3 and 4), which is related to either the monitoring target object related to the ignited code or the monitoring target object related to the monitor code is also displayed, and the coupling relations thereof are displayed as well.

Either part or all of the information included in the event entry (in this example, the generation-source identification data 551 and the event type 552) is displayed in the monitored cause event entry list display area 506 for both p1 and p2, which are regarded as the monitored cause events.

According to the second example above, in a case where the generation source of the concluded cause event is the virtual device, the causal laws code 180 in which the related virtual device (which also includes the generation source of the concluded cause event) is regarded as the generation source of this cause event is selected as the monitor code. Consequently, even though there is no superficial link (the event propagation relation) with the concluded cause event, the administrator 103 is also able to monitor on a priority basis the event that has as its generation source the monitoring target object, which is substantially linked via the physical device to the generation source of the concluded cause event.

Mode for the Invention 3

A third example of the present invention will be explained below. In so doing, the points of difference with the first example will mainly be explained, and explanations of the points in common with the first example will be simplified or omitted.

Figure 18:
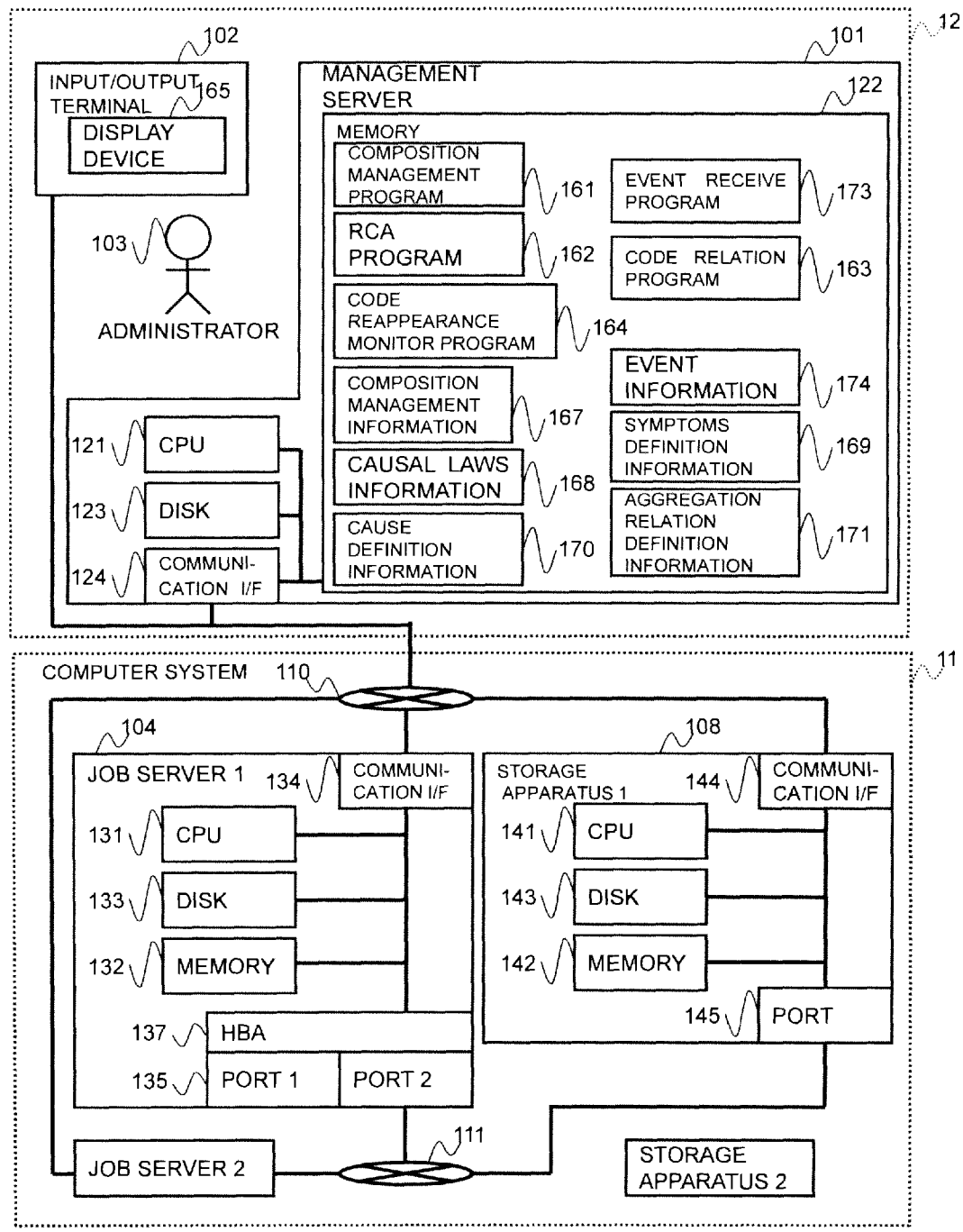
FIG. 18 is a diagram showing an example of the overall composition of an information processing system related to a third example.

FIG. 18 is a diagram showing an example of the overall composition of an information processing system 1 related to the third example.

The job server 104 comprises a HBA (Host Bus Adapter) 137. Two ports 135 (port 1 and port 2) are disposed in the HBA 137. The job server 104 is coupled to the SAN 111 through either one of the ports 135. Aggregation relation definition information 172 is stored in the memory 122 of the management server 101.

FIG. 19 is a diagram showing an example of the aggregation relation definition information 172.

The aggregation relation definition information 172 is information for defining the aggregation relationship (the inclusive relation) between monitoring target objects. A lower-level device 281 is the identification data of the monitoring target object (called "lower-level device" below) of the aggregated side (the lower-level side). A higher-level device 282 is the identification data of the monitoring target object (called "higher-level device" below) of the aggregation side (the higher-level side). A function interchangeability 283 is information showing whether or not the higher-level device is capable of providing the lower-level device functions in place of the lower-level device in the corresponding aggregation relation.

As used here, "D", "HBA", "HBA-P", "L", "FC-P", "SV" and "ST" in FIG. 19 are identification data respectively denoting the server disk 133, the HBA 137, the port 135 of the job server 104 (called the "server port" below), the storage disk 143, the port 145 of the storage apparatus 108 (called the "storage port" below), and the storage apparatus 108. Therefore, for example, row 284 shows the fact that the server disk 133 is aggregated in the job server 104, and the fact that the job server 104 is not able to substitute for the functions of the server disk 133. Similarly, row 286 shows that fact that the server port 135 is aggregated in the HBA 137, and the fact that the HBA 137 is able to substitute for the function of the server port 135.

The processing of the third example is substantially the same as the processing of the first example except for the method of selecting the monitor code (the processing method of the Step S315 of FIG. 7). When selecting the monitor code in the third example, the code relation program 163 may select the monitor code by also referring to the aggregation relation definition information 172 in addition to the post-cause elimination causal laws information 168 and the ignited code. The method for selecting the monitor code will be described further below.

The third example will be explained using the following series of scenarios (A3) through (C3). Furthermore, the scenarios that follow are merely examples, and do not purport to limit the applicable scope of this example.

(A3) As shown in FIG. 18, the administrator 103 uses the management server 101 to operate and manage the computer system 11 to which are coupled two job servers 104 (a job server 1 and a job server 2) and one storage apparatus 108 (a storage apparatus 1). The job servers 1 and 2 here both comprise two server ports 135 (a server port 1 and a server port 2), and are both coupled to the SAN 111 via the server port 1. A server port M of a job server N (where N and M are either 1 or 2) will be notated as "server port N-M" below. That is, for example, the server port 1 of the job server 1 is "server port 1-1". Further, the data respectively used by the job servers 1 and 2 is stored in the storage disk 143 of the storage apparatus 1. Furthermore, the fact that a "storage port failure" in the storage apparatus 108 will propagate to a "server port failure" in the job server 104 that uses this storage apparatus 108 is defined in the event propagation model.

(B3) After the start of operation, there occurs an event in which there is a server port 135 failure in both the server port 1-1 and the server port 2-1 due to a failure in the storage port 145 of the storage apparatus 1. The server port 135 failure events that occur in the server port 1-1 and the server port 2-1 will respectively be called "server port failure event 1-1" and "server port failure event 2-1" below. The RCA program 162, which detects the server port failure events 1-1 and 1-2, carries out the processing of FIG. 5, determines that the cause event is an event in which the storage port 145 of the storage apparatus 1 failed (called "storage port failure event 1" below), and identifies the cause of the failure as the storage port 145 of the storage apparatus 1.

(C3) The administrator 103, who learns of the cause of the failure in accordance with the cause analysis result display screen 1001, replaces the storage apparatus 1 with a storage apparatus 2, which is different from the storage apparatus 1, in order to eliminate the cause. At this point, the administrator 103 changes the server port 135 for coupling to the SAN 111 (called "SAN coupling port" below) of the job server 1 from the server port 1-1 to the server port 1-2.

The third example will be explained in detail in accordance with the above-mentioned scenarios (A3) through (C3).

The RCA program 162 creates the various information of FIGS. 20 through 22 by executing the Step S301 of FIG. 5. That is, FIGS. 20 through 22 show the pre-cause elimination causal laws information 168, the symptoms definition information 169, and the cause definition information 170 of the third example. In the third example, the event e1 signifies the server port failure event 1-1, the event e2 signifies the server port failure event 2-1, and the event p1 signifies the storage port failure event 1.

Thereafter, the RCA program 162 detects the server port failure events 1-1 and 2-1, and identifies the cause by referring to the causal laws information 168. As shown in FIG. 20, the causal laws information 168 here comprises the causal laws code "[e1, e2]→p1". Therefore, since the server port failure events 1-1 and 2-1 match the symptom event set (e1, e2), it is concluded that the cause event p1 (that is, the storage port failure event 1) is the root cause. Furthermore, the above-mentioned causal laws code "[e1, e2]→p1" is the ignited code. Then, an event entry related to the storage port failure event 1 is displayed in the display area 405 of the cause analysis result display screen 1001.

Thereafter, the administrator, who discerns the cause in accordance with the cause analysis result display screen 1001, carries out the measure of the above-mentioned scenario (C3) in order to eliminate the cause.

When the cause has been eliminated and the composition of the computer system 11 has been changed, the RCA program 162 creates causal laws information 168 corresponding to the post-change composition. FIGS. 23 through 25 respectively show the post-cause elimination causal laws information 168, the symptoms definition information 169, and the cause definition information 170 of the third example. Furthermore, in the third example, an event e3 signifies a failure event of the server port 135 that occurred in the server port 1-2 (called "server port failure event 1-2" below), and an event p2 signifies an event in which the storage port 145 of the storage apparatus 2 fails (called "storage port failure event 2" below).

As is clear from FIG. 23, the ignited code ("[e1, e2]→p1") does not exist in the pre-cause elimination causal laws information 168, and instead, there exists the causal laws code "[e2, e3]→p2". Here, in addition to the cause event, the deleted ignited code "[e1, e2]→p1" and the added causal laws code "[e2, e3]→p2" also cease to match the symptom event set. This is because, in addition to the generation source of the concluded cause event, the generation source of the detected symptom event has also changed. That is, it is because the storage apparatus 1 has been changed to the storage apparatus 2, and the SAN coupling port of the job server 1 has been changed from server port 1-1 to server port 1-2.

In a case where the generation source of the detected symptom event (in this example, the SAN coupling port of the job server 1) has also been changed, the code relation program 163 is not able to select the monitor code using the same method as the first example. This is because, as explained above, the symptom event set of the causal laws code 180 added to the post-cause elimination causal laws information 168 does not match with the detected event set, and normally the causal laws code 180, in which this symptom event set matches with the detected symptom event set, no longer exists in the post-update causal laws information 168.

For this reason, the code relation program 163 selects the monitor code as follows. That is, first, the code relation program 163 selects, from among the causal laws codes 180 included in the post-cause elimination causal laws information 168, a single causal laws code 180 to use as a target (called "target causal laws code" below) for determining whether or not this target causal laws code will become the monitor code.

Then, the code relation program 163 refers to the aggregation relation definition information 172, and for both the generation source of the detected symptom event and the generation source of the symptom event of the target causal laws code 180 (called "target symptom event" below), determines whether or not there exists a higher-level device, which uses this generation source as a lower-level device, and, in addition, which is able to substitute for the function of this lower-level device (called "aggregatable device" below). Then, in a case where an aggregatable device exists, the code relation program 163 treats this generation source as the aggregatable device in making the determination as to whether or not the target causal laws code 180 will become the monitor code.

In this example, in a case where the causal laws code "[e2, e3]→p2" is selected as the target causal laws code 180, the target symptom events are the event e2 and the event e3 and the generations sources thereof are the server port 2-1 and the server port 1-2, respectively. Row 286 of the aggregation relation definition information 172 here shows that the server ports 135 are aggregated in the HBA 137, and that the HBA 137 is able to substitute for the functions of the server ports 135. Therefore, in the determination as to whether or not the target causal laws code 180 will become the monitor code, the server port 2-1 is handled as the HBA 137 of the job server 2, and the server port 1-2 is handled as the HBA 137 of the job server 1. Meanwhile, the detected symptom events are the event e1 and the event e2 and the generation sources thereof are the server port 1-1 and the server port 2-1, respectively. Then, since an aggregatable device exists for these generation sources the same as described above, these generation sources are handled as the aggregatable device. That is, in the determination as to whether or not the target causal laws code 180 will become the monitor code, the server port 1-1 is handled as the HBA 137 of the job server 1, and the server port 2-1 is handled as the HBA 137 of the job server 2.

On the basis of the above handling, the code relation program 163 determines whether or not the detected symptom event set matches with the symptom event set of the target causal laws code 180. In this example, the detected symptom event set (e1, e2) and the symptom event set of the target causal laws code 180 (e2, e3) match because the generation source of the event e1 and the generation source of the event e3 are both managed as the HBA 137 of the job server 1 on the basis of the above-described handling. Further, the event type of the event e1 and the event type of the event e3 also match. Therefore, the event e1 and the event e3 are determined to be a match. Further, the event e2 included in both symptom event sets is the same. Therefore, as a result of this, the detected symptom event set (e1, e2) is determined to match the target causal laws code 180 symptom event set (e2, e3), and the target causal laws code "[e2, e3]→p2" is selected as the monitor code.

The code relation program 163 is able to use the same processing as that described above to determine whether or not a causal laws code 180 will become the monitor code for all the causal laws codes 180 included in the post-cause elimination causal laws information 168.

Figure 26:
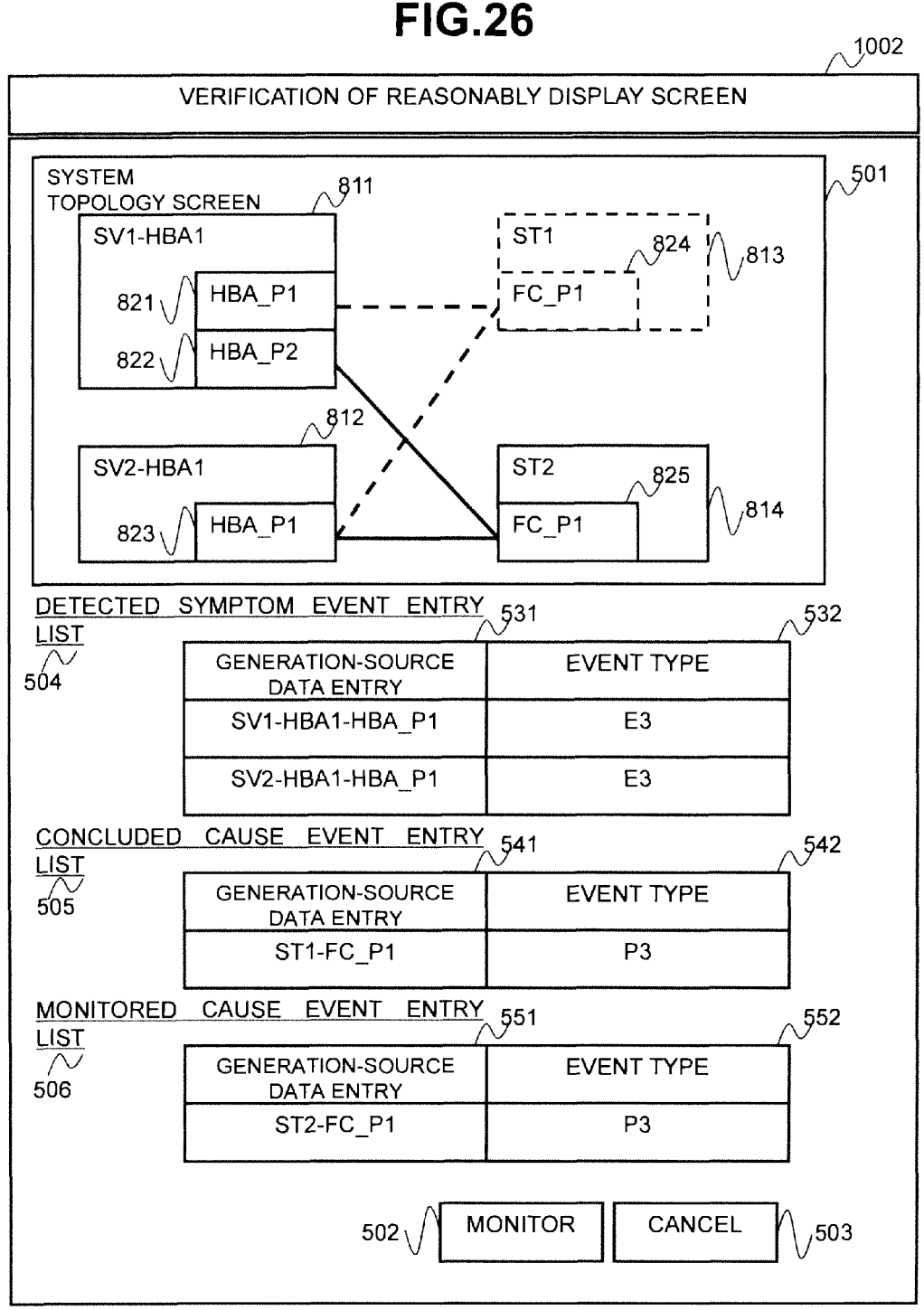
FIG. 26 is a diagram showing an example of the verification of reasonably display screen displayed under the scenario of the third example.

FIG. 26 is a diagram showing an example of the verification of reasonably display screen 1002 displayed under the scenarios of the third example.

Either a part or all of the information included in the event entry for p2, which is regarded as the monitored cause event (in this example, the generation-source identification data 551 and the event type 552), is displayed in the monitored cause event entry list display area 506.

Furthermore, in this example, the aggregatable device is limited to a function interchangeable device for the following reason. That is, it is because in a case where a limitation like this does not exist, for example, it becomes possible to make a determination as to whether or not generation sources match in units of node devices, which are the highest level devices (in other words, the determination granularity is likely to become too rough), thereby raising the possibility of a causal laws code 108 that is not suitable as the monitor code being selected as the monitor code.

According to the third example above, the comparison of symptom event sets (the detected symptom event set and the target causal laws code 180 symptom event set) in the processing for selecting the monitor code is carried out as follows. That is, when a determination (a generation-source determination) is made as to whether or not the generation source of the detected symptom event (a first device) matches the generation source of the symptom event of the target causal laws code 180 (a second device) in the comparison of the symptom event sets, in a case where the aggregatable device of the first device and the aggregatable device of the second device were a match, the generation-source determination is carried out by regarding the first device and the second device as being a match. Consequently, the operation management system 12 is able to select a suitable monitor code even in a case where a change occurs in the generation source of the detected symptom event in accordance with cause elimination measures.

Mode for the Invention 4

A fourth example of the present invention will be explained below. In so doing, the points of difference with the third example will mainly be explained, and explanations of the points in common with the third example will be simplified or omitted.

The composition of the fourth example is the same as that of the third example. That is, FIG. 18 is a diagram showing the overall composition of the information processing system 1 related to the fourth example.

The fourth example will be explained using the following series of scenarios (A4) through (C4). Furthermore, the following scenarios are merely examples, and do not purport to limit the applicable scope of this example.

(A4) As shown in FIG. 18, the administrator 103 uses the management server 101 to operate and manage the computer system 11 to which is coupled two job servers 104 (a job server 1 and a job server 2) and one storage apparatus 108 (a storage apparatus 1). The data used by the respective job servers 1 and 2 here is stored in the storage disk 143 of the storage apparatus 1. Furthermore, the fact that a "storage disk failure" in the storage apparatus 108 will propagate to a "storage port failure" in this storage apparatus 108 and to a "server disk failure" in the job server 104 that uses this storage apparatus 108 is defined in the event propagation model.

(B4) After the start of operation, a storage port failure event 1, a server disk failure event 1 and a server disk failure event 2 occur due to a failure in the storage disk 143 of the storage apparatus 1. The RCA program 162, which detects the storage port failure event 1 and the server disk failure events 1 and 2, carries out the processing of FIG. 5, determines that the cause event is a storage disk failure event 1, and identifies the cause of the failure as the storage disk 143 of the storage apparatus 1.

(C4) The administrator 103, who learns of the cause of the failure in accordance with the cause analysis result display screen 1001, in order to eliminate the cause, replaces the storage apparatus 1 with a storage apparatus 2, which is different from the storage apparatus 1, and configures the storage apparatus 2 such that the respective job servers 1 and 2 are able to access the storage disk 143 of the storage apparatus 2.

The fourth example will be explained in details in accordance with the above-described scenarios (A4) through (C4).

The RCA program 162 creates the various information of FIGS. 27 through 29 by executing the Step S301 of FIG. 5. That is, FIGS. 27 through 29 show the pre-cause elimination causal laws information 168, the symptoms definition information 169, and the cause definition information 170 of the fourth example. In the fourth example, the event e1 signifies the server disk failure event 1, the event e2 signifies the server disk failure event 2, the event e3 signifies the storage port failure event 1, and the event p1 signifies the storage disk failure event 1.

Thereafter, the RCA program 162 detects the storage port failure event 1 and the server disk failure events 1 and 2, and identifies the cause by referring to the causal laws information 168. As shown in FIG. 27, the causal laws information 168 here comprises a causal laws code "[e1, e2, e3]→p1". Therefore, since the storage port failure event 1 and the server disk failure events 1 and 2 match the symptom event set (e1, e2, e3), the cause event p1 (that is, the storage disk failure event 1) is concluded to be the root cause. Furthermore, the above-mentioned causal laws code "[e1, e2, e3]→p1" is the ignited code. Then, an event entry related to the storage disk failure event 1 is displayed in the display area 405 of the cause analysis result display screen 1001.

Thereafter, the administrator, who discerns the cause in accordance with the cause analysis result display screen 1001, carries out the measures of the above-mentioned scenario (C4) in order to eliminate the cause.

When the cause has been eliminated and the composition of the computer system 11 has been changed, the RCA program 162 creates causal laws information 168 corresponding to the post-change composition. FIGS. 30 through 32 respectively show the post-cause elimination causal laws information 168, the symptoms definition information 169, and the cause definition information 170 of the fourth example. Furthermore, in the fourth example, an event e4 signifies a storage port failure event 2, and the event p2 signifies the storage disk failure event 2.

As is clear from FIG. 30, the ignited code ("[e1, e2, e3]→p1") does not exist in the pre-cause elimination causal laws information 168, and instead, there exists the causal laws code "[e1, e2, e4]→p2". The same as in the third example, in addition to the cause event, the deleted ignited code "[e1, e2, e3]→p1" and the added causal laws code "[e1, e2, e4]→p2" also cease to match the symptom event set. This is because the generation source of the concluded cause event and the generation source of the detected symptom event are mounted in the same node device, and the generation source of the detected symptom event has also been changed in addition to the generation source of the concluded cause event in accordance with the replacing of the node device, which was carried out for cause elimination. That is, it is because a change occurred in the storage port 145 of the storage port 1 (it ceased to exist) in accordance with the storage apparatus 1 having been changed to the storage apparatus 2.

The same as in the third example, since a change also occurred in the generation source of the detected symptom event (in this example, the storage port 145 of the storage port 1), the code relation program 163 is not able to select the monitor code using the same method as the first example.

For this reason, the code relation program 163 selects the monitor code as follows. That is, first, the code relation program 163 selects, from among the causal laws codes 180 included in the post-cause elimination causal laws information 168, a single causal laws code 180 to use as a target (the target causal laws code) for determining whether or not this target causal laws code will become the monitor code.

Then, the code relation program 163 determines whether or not the higher-level device of the generation source of this cause event matches the higher-level device of the generation source of this symptom event for each of the ignited code and the target causal laws code 180. It is possible for the code relation program 163 to know the generation-source higher-level device here by referring to the aggregation relation definition information 172. Further, in a case where there is a plurality of higher-level devices, the code relation program 163, for example, is able to use the highest level device as the higher-level device. Then, in a case where the generation-source higher-level device of the cause event matches the generation-source higher-level device of the symptom event, the code relation program 163 ignores this generation-source higher-level device-matched symptom event (called a "higher-level matched symptom event" below) and makes a determination as to whether or not this target causal laws code 180 will become the monitor code, that is, makes a determination as to whether or not the detected symptom event set matches the target causal laws code 180 symptom event set.

In a case where the causal laws code "e1, e2, e4]→p2" is selected as the target causal laws code 180 in this example, the target causal laws code 180 symptom events (the target symptom events) are an event e1, an event e2 and an event e4, and the generations sources thereof are the server disk 133 of the job server 1, the server disk 133 of the job server 2, and the storage port 2, respectively. Then, because row 284 of the aggregation relation definition information 172 shows the fact that the server disk 133 is aggregated in the job server 104, it is concluded that the higher-level device of the server disk 133 of the job server 1 is job server 1. Similarly, it is concluded that the higher-level device of the server disk 133 of the job server 2 is job server 2. Further, since row 288 of the aggregation relation definition information 172 shows that the storage port 145 is aggregated in the storage apparatus 108, it is concluded that the higher-level device of the storage port 2 is the storage apparatus 2.

Meanwhile, the cause event of the target causal laws code 180 (called a "target cause event" below) is the event p2, and the generation source thereof is the storage disk 143 of the storage apparatus 2. Then, since row 278 of the aggregation relation definition information 172 shows that the storage disk 143 is aggregated in the storage apparatus 108, it is determined that the higher-level device of the storage disk 143 of the storage apparatus 2 is the storage apparatus 2.

When comparing the generation-source higher-level device of the target cause event and the generation-source higher-level device of the target symptom event here, the higher-level device of the storage port 2, which is the generation source of the event e4, and the higher-level device of the storage disk 143 of the storage apparatus, which is the generation source of the event p2, match up in the storage apparatus 2. Therefore, this generation-source higher-level device-matched symptom event e4 is the higher-level matched symptom event, and is ignored at the time of the comparison with the detected symptom event set.

The same holds true for the ignited code "[e1, e2, e3]→p1". That is, the generation sources of the detected symptom events e1, e2, e3 are the server disk 133 of the job server 1, the server disk 133 of the job server 2, and the storage port 1, respectively. Then, the higher-level device of the server disk 133 of the job server 1 is determined to be the job server 1, the higher-level device of the server disk 133 of the job server 2 is determined to be the job server 2, and the higher-level device of the storage port 1 is determined to be the storage apparatus 1. Meanwhile, the generation source of the concluded cause event p1 is the storage disk 143 of the storage apparatus 1. Then, the higher-level device of the storage disk 143 of the storage apparatus 1 is determined to be the storage apparatus 1. Therefore, the detected symptom event e3 for the ignited code "[e1, e2, e3]→p1" is the higher-level matched symptom event, and is ignored at the time of comparison with the target causal laws code 180 symptom event set.

Based on the above, the code relation program 163 determines whether or not the detected symptom event set and the symptom event set of the target causal laws code 180 are a match. In this example, since the higher-level matching symptom events e3 and e4 are ignored in the comparison of the detected symptom event set (e1, e2, e3) and the target causal laws code 180 symptom event set (e1, e2, e4), the parts (e1, e2) that are not ignored match, and a determination is made that the two event sets are a match. Therefore, the target causal laws code "[e1, e2, e4]→p2" is selected as the monitor code. [0188]

The code relation program 163, using the same processing as that described above, is able to determine whether or not a causal laws code 180 will become the monitor code for all the causal laws codes 180 included in the post-cause elimination causal laws information 168.

Figure 33:
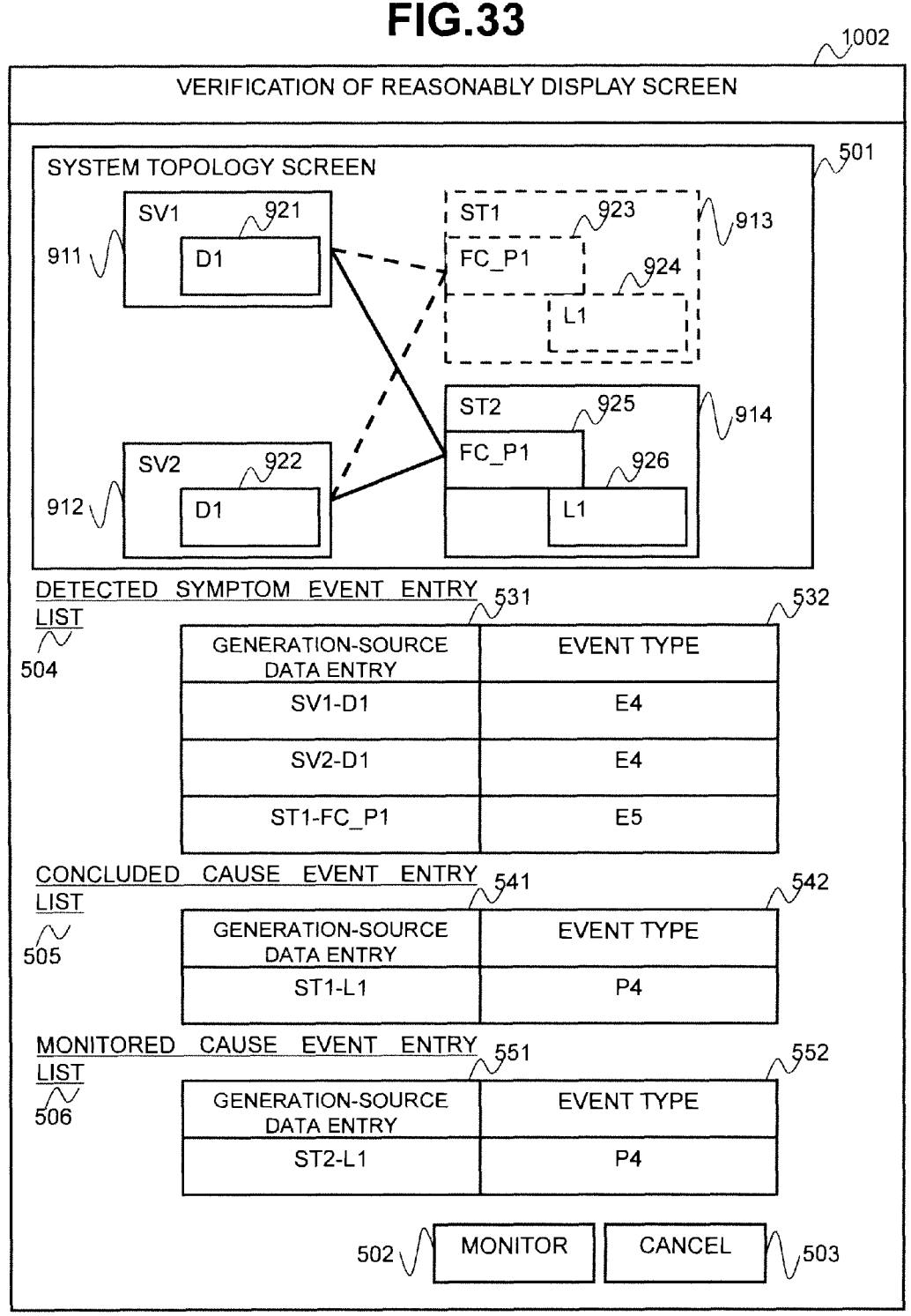
FIG. 33 is a diagram showing an example of the verification of reasonably display screen displayed under the scenario of the fourth example.

FIG. 33 is a diagram showing an example of the verification of reasonably display screen 1002 displayed under the scenarios of the fourth example.

Either part or all of the information (in this example, the generation-source identification data 551 and event type 552) included in the event entry for p2, which is regarded as the monitored cause event, is displayed in the monitored cause event entry list display area 506.

According to the fourth example above, in the process for selecting the monitor code, a comparison of the symptom event sets (the detected symptom event set and the target causal laws code 180 symptom event set) is carried out as follows. That is, when a determination is made as to whether or not the detected symptom event set matches the target causal laws code 180 symptom event set, an exclusive event is determined based on the relationship between the symptom event generation source and the cause event generation source for both the ignited code and the target causal laws code 180. Then, in a case where the event set of the detected symptom event set minus the exclusive event matches the event set of the target causal laws code 180 symptom event set minus the exclusive event, the detected symptom event set and the target causal laws code 180 symptom event set are regarded as a match, and the above-mentioned second code selection determination is carried out. Consequently, since the concluded cause event generation source and the detected symptom event generation source are mounted to the same node device, the operation management system 12 is able to select a suitable monitor code even in a case where the detected symptom event generation source has been changed in accordance with the measures taken for cause elimination.

Figure 34:
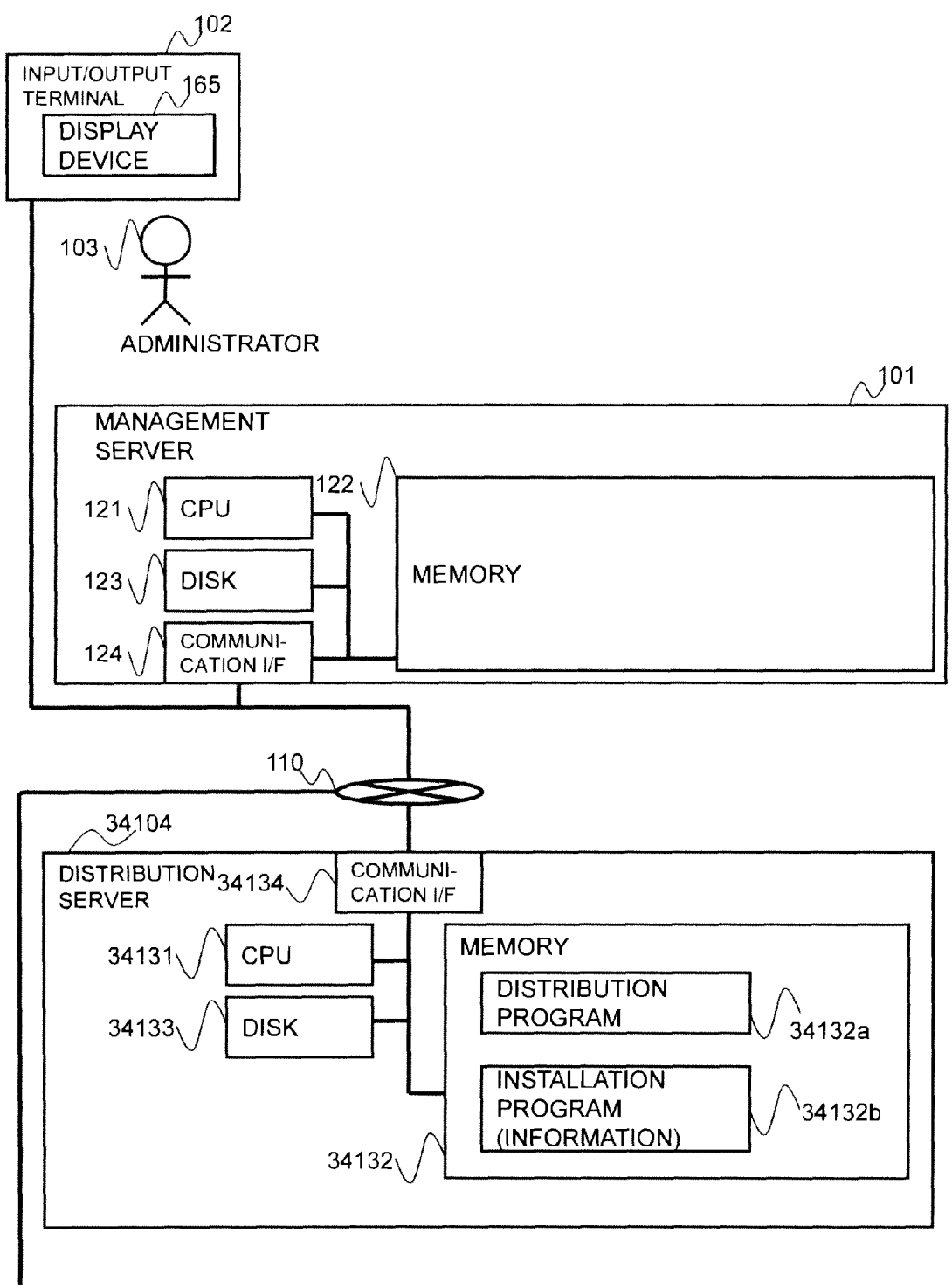
FIG. 34 is a diagram showing an example of a program distribution server for distributing a program.

FIG. 34 is a diagram showing an example of a program distribution server 34104 for distributing a program.

The program distribution server 34104 comprises a CPU 34131, a memory (a semiconductor memory 34132 and/or a disk 34133 or other such storage device), and a communication I/F 34134. The memory 34132 stores an installation program 34132*b*, which is a computer program for installing in the management server 101 various computer programs (called a "target program" below), such as the code relation program 163 and the code reappearance monitor program 164, and a distribution program 32132*a*, which is a computer program for distributing the installation program 34132*b*. The distribution program 34132*a*, in response to a request from either the management server 101 or another device, sends the installation program 34132*b* to the device that issued this request.

The numerous examples of the present invention described above are merely examples for use in explaining the present invention, and do not purport to limit the scope of the present invention solely to these examples. The present invention may be put into practice using various other modes without departing from the gist thereof.

The invention claimed is:

1. A management server for managing a computer system that includes a plurality of node devices, comprising:
    a storage resource; and
    a processor coupled to the storage resource,
    wherein the storage resource stores an event cause information including a cause identification code for each of a symptom event set,
    wherein the cause identification code is data denoting a relationship between the symptom event set and a cause event,
    wherein the symptom event set is a combination of one or more symptom events, wherein the cause event is an event of a cause,
    wherein the symptom event is an event that is generated having the cause event, and
    wherein the processor:
    (a) detects one or more first events;
    (b) selects from among the event cause information a first cause identification code corresponding to the symptom event set that matches a combination of the one or more first events;
    (c) identifies the cause event denoted by the first cause identification code as a cause of generation of the one or more first events;
    (d) changes the event cause information to a post-change event cause information corresponding to a post-change composition of the computer system in a case where a composition of the computer system has been changed to eliminate the cause of generation of the one or more first events; and
    (e) selects from the post-change event cause information a second cause identification code corresponding to the symptom event set that matches the symptom event set denoted by the first cause identification code, and notifies information related to the second cause identification code to an administrator,
    wherein the storage resource stores aggregation relation information denoting a relationship between a target device, which exists inside the computer system and is able to become a source of generation of an event, and a higher-level device and/or a lower-level device of the target device, and wherein the processor carries out the processing of the (e) based on a first device, which is the generation-source device of the symptom event denoted by the first cause identification code, a second device, which is the generation-source device of either the symptom event or the cause event denoted by the selected cause identification code, and the aggregation relation information.

2. A management server for managing a computer system that includes a plurality of node devices, comprising:
    a storage resource; and
    a processor coupled to the storage resource,
    wherein the storage resource stores an event cause information including a cause identification code for each of a symptom event set,
    wherein the cause identification code is data denoting a relationship between the symptom event set and a cause event,
    wherein the symptom event set is a combination of one or more symptom events, wherein the cause event is an event of a cause,
    wherein the symptom event is an event that is generated having the cause event, and
    wherein the processor:
    (a) detects one or more first events;
    (b) selects from among the event cause information a first cause identification code corresponding to the symptom event set that matches a combination of the one or more first events;
    (c) identifies the cause event denoted by the first cause identification code as a cause of generation of the one or more first events;
    (d) changes the event cause information to a post-change event cause information corresponding to a post-change composition of the computer system in a case where a composition of the computer system has been changed to eliminate the cause of generation of the one or more first events; and
    (e) selects from the post-change event cause information a second cause identification code corresponding to the symptom event set that matches the symptom event set denoted by the first cause identification code, and notifies information related to the second cause identification code to an administrator,
    wherein, when symptom events match, symptom event sets match, wherein a condition for the symptom event match is that a generation-source device of the symptom event matches, wherein the storage resource stores a aggregation relation information denoting a relationship between a target device, which exists inside the computer system and is able to become a source of generation of an event, and a higher-level device and/or a lower-level device of the target device, and wherein the processor:
    (x1) the (e), determines whether or not the symptom event set denoted by the first cause identification code matches the symptom event set denoted by a cause identification code selected from the post-change event cause information;
    (x2) in this determination, makes a generation-source determination as to whether or not a first device, which is the generation-source device of the symptom event denoted by the first cause identification code, matches a second device, which is the generation-source device of the symptom event denoted by the selected cause identification code; and
    (x3) in the generation-source determination, determines that the first device matches the second device in a case where the identification is made from the aggregation relation information that the higher-level device of the first device matches the higher-level device of the second device.

3. A management server for managing a computer system that includes a plurality of node devices, comprising:
    a storage resource; and
    a processor coupled to the storage resource,
    wherein the storage resource stores an event cause information including a cause identification code for each of a symptom event set,
    wherein the cause identification code is data denoting a relationship between the symptom event set and a cause event,
    wherein the symptom event set is a combination of one or more symptom events, wherein the cause event is an event of a cause,
    wherein the symptom event is an event that is generated having the cause event, and wherein the processor:

(a) detects one or more first events;

(b) selects from among the event cause information a first cause identification code corresponding to the symptom event set that matches a combination of the one or more first events;

(c) identifies the cause event denoted by the first cause identification code as a cause of generation of the one or more first events;

(d) changes the event cause information to a post-change event cause information corresponding to a post-change composition of the computer system in a case where a composition of the computer system has been changed to eliminate the cause of generation of the one or more first events; and (e) selects from the post-change event cause information a second cause identification code corresponding to the symptom event set that matches the symptom event set denoted by the first cause identification code, and notifies information related to the second cause identification code to an administrator, wherein, when symptom events match, symptom event sets match, wherein a condition for the symptom event match is that a generation-source device of the symptom event matches, wherein a storage resource stores a aggregation relation information denoting the relationship between a target device, which exists inside the computer system and is able to become a source of generation of an event, and a higher-level device and/or a lower-level device of the target device, and wherein the processor, in the (e), makes an event matching determination as to whether or not the symptom event set denoted by a first cause identification code matches the symptom event set denoted by the cause identification code selected from the post-change event cause information, and in the event matching determination, carries out the processing below:

(y1) in a case where the identification is made from the aggregation relation information that the higher-level device of the generation-source device of the symptom event denoted by the first cause identification code matches the higher-level device of the generation-source device of the cause event denoted by the first cause identification code, this symptom event is made a first exclusive event;

(y2) in a case where the identification is made from the aggregation relation information that the higher-level device of the generation-source device of the symptom event denoted by the selected cause identification code matches the higher-level device of the generation-source device of the cause event denoted by the selected cause identification code, this symptom event is made a second exclusive event; and (y3) in a case where the event set excluding the first exclusive event of the symptom event set denoted by the first cause identification code matches the event set excluding the second exclusive event of the symptom event set denoted by the selected cause identification code, determination is made that the symptom event set denoted by the first cause identification code matches the symptom event set denoted by the selected cause identification code.

4. A management server for managing a computer system that includes a plurality of node devices, comprising:

a storage resource; and a processor coupled to the storage resource, wherein the storage resource stores an event cause information including a cause identification code for each of a symptom event set, wherein the cause identification code is data denoting a relationship between the symptom event set and a cause event, wherein the symptom event set is a combination of one or more symptom events, wherein the cause event is an event of a cause, wherein the symptom event is an event that is generated having the cause event, and wherein the processor:

(a) detects one or more first events;

(b) selects from among the event cause information a first cause identification code corresponding to the symptom event set that matches a combination of the one or more first events;

(c) identifies the cause event denoted by the first cause identification code as a cause of generation of the one or more first events;

(d) changes the event cause information to a post-change event cause information corresponding to a post-change composition of the computer system in a case where a composition of the computer system has been changed to eliminate the cause of generation of the one or more first events; and (e) selects from the post-change event cause information a second cause identification code corresponding to the symptom event set that matches the symptom event set denoted by the first cause identification code, and notifies information related to the second cause identification code to an administrator, wherein the storage resource stores a physical device information showing the relationship between a virtualized virtual device, which exists inside the computer system and is able to become the source of generation of an event, and a real physical device related to the virtual device, and wherein the processor, in a case where a generation-source device of the cause event denoted by the first cause identification code is the virtual device, identifies the physical device related to the generation-source device of the cause event of the first cause identification code based on the physical device information, identifies all the virtual devices related to the identified physical device, adds all the cause identification codes that include the identified virtual device as the generation-source of this cause event to the cause identification code selected by comparing the symptom event set of the first cause identification code with the symptom event set of the cause identification code included in the post-change event cause information, and selects the same as a second cause identification code.

5. A management system for managing a computer system having a plurality of node devices comprising:

a storage resource;

a management server comprising a processor coupled to the storage resource; and an input/output device comprising a display device, wherein the storage resource stores an event cause information including a cause identification code for each of a symptom event set, wherein the cause identification code is data denoting a relationship between the symptom event set and a cause event, wherein the symptom event set is a combination of one or more symptom events, wherein the cause event is an event as a cause, wherein the symptom event is an event generated having the cause event as the cause, and wherein the processor:

(a) detects one or more first events;

(b) selects from among the event cause information a first cause identification code corresponding to the symptom event set matching a combination of the one or more first events;

(c) identifies the cause event denoted by the first cause identification code as the generation cause of the one or more first events;

(d) in a case where a composition of the computer system has been changed to eliminate the cause of generation of the one or more first events, changes the event cause information to event cause information corresponding to a post-change composition of the computer system; and (e) notifies an administrator of information related to a second cause identification code by selectin from among the post-chance event cause information the second cause identification code corresponding to the symptom event set that matches the symptom event set denoted by the first cause identification code, and displaying information related to the second cause identification code on the display device, wherein the storage resource stores aggregation relation information denoting a relationship between a target device, which exists inside the computer system and is able to become a source of generation of an event, and a higher-level device and/or a lower-level device of the target device, and wherein the processor carries out the processing of the (e) based on a first device, which is the generation-source device of the symptom event denoted by the first cause identification code, a second device, which is the generation-source device of either the symptom event or the cause event denoted by the selected cause identification code, and the aggregation relation information.

6. A management system for managing a computer system having a plurality of node devices, comprising:

a storage resource;

a management server comprising a processor coupled to the storage resource; and an input/output device comprising a display device, wherein the storage resource stores an event cause information including a cause identification code for each of a symptom event set, wherein the cause identification code is data denoting a relationship between the symptom event set and a cause event, wherein the symptom event set is a combination of one or more symptom events, wherein the cause event is an event as a cause, wherein the symptom event is an event generated having the cause event as the cause, and wherein the processor:

(a) detects one or more first events;

(b) selects from among the event cause information a first cause identification code corresponding to the symptom event set matching a combination of the one or more first events;

(c) identifies the cause event denoted by the first cause identification code as the generation cause of the one or more first events;

(d) in a case where a composition of the computer system has been changed to eliminate the cause of generation of the one or more first events, changes the event cause information to event cause information corresponding to a post-change composition of the computer system; and (e) notifies an administrator of information related to a second cause identification code by selecting from among the post-change event cause information the second cause identification code corresponding to the symptom event set that matches the symptom event set denoted by the first cause identification code, and displaying information related to the second cause identification code on the display device, wherein, when symptom events match, symptom event sets match, wherein a condition for the symptom event match is that a generation-source device of the symptom event matches, wherein the storage resource stores a aggregation relation information denoting a relationship between a target device, which exists inside the computer system and is able to become a source of generation of an event, and a higher-level device and/or a lower-level device of the target device, and wherein the processor:

(x1) the (e), determines whether or not the symptom event set denoted by the first cause identification code matches the symptom event set denoted by a cause identification code selected from the post-change event cause information;

(x2) in this determination, makes a generation-source determination as to whether or not a first device, which is the generation-source device of the symptom event denoted by the first cause identification code, matches a second device, which is the generation-source device of the symptom event denoted by the selected cause identification code; and (x3) in the generation-source determination, determines that the first device matches the second device in a case where the identification is made from the aggregation relation information that the higher-level device of the first device matches the higher-level device of the second device.

7. A management system for managing a computer system having a plurality of node devices, comprising:

a storage resource;

a management server comprising a processor coupled to the storage resource; and an input/output device comprising a display device, wherein the storage resource stores an event cause information including a cause identification code for each of a symptom event set, wherein the cause identification code is data denoting a relationship between the symptom event set and a cause event, wherein the symptom event set is a combination of one or more symptom events, wherein the cause event is an event as a cause, wherein the symptom event is an event generated having the cause event as the cause, and wherein the processor:

(a) detects one or more first events;

(b) selects from among the event cause information a first cause identification code corresponding to the symptom event set matching a combination of the one or more first events;

(c) identifies the cause event denoted by the first cause identification code as the generation cause of the one or more first events;

(d) in a case where a composition of the computer system has been changed to eliminate the cause of generation of the one or more first events, changes the event cause information to event cause information corresponding to a post-change composition of the computer system; and (e) notifies an administrator of information related to a second cause identification code by selectin from among the post-change event cause information the second cause identification code corresponding to the symptom event set that matches the symptom event set denoted by the first cause identification code, and displaying information related to the second cause identification code on the display device, wherein, when symptom events match, symptom event sets match, wherein a condition for the symptom event match is that a generation-source device of the symptom event matches, wherein a storage resource stores a aggregation relation information denoting a relationship between a target device, which exists inside the computer system and is able to become a source of generation of an event, and a higher-level device and/or a lower-level device of the target device, and wherein the processor, in the (e), makes an event matching determination as to whether or not the symptom event set denoted by a first cause identification code matches the symptom event set denoted by the cause identification code selected from the post-change event cause information, and in the event matching determination, carries out the processing below:

(y1) in a case where the identification is made from the aggregation relation information that the higher-level device of the generation-source device of the symptom event denoted by the first cause identification code matches the higher-level device of the generation-source device of the cause event denoted by the first cause identification code, this symptom event is made a first exclusive event;

(y2) in a case where the identification is made from the aggregation relation information that the higher-level device of the generation-source device of the symptom event denoted by the selected cause identification code matches the higher-level device of the generation-source device of the cause event denoted by the selected cause identification code, this symptom event is made a second exclusive event; and (y3) in a case where the event set excluding the first exclusive event of the symptom event set denoted by the first cause identification code matches the event set excluding the second exclusive event of the symptom event set denoted by the selected cause identification code, determination is made that the symptom event set denoted by the first cause identification code matches the symptom event set denoted by the selected cause identification code.

8. A management system for managing a computer system having a plurality of node devices, comprising:

a storage resource;

a management server comprising a processor coupled to the storage resource; and an input/output device comprising a display device, wherein the storage resource stores an event cause information including a cause identification code for each of a symptom event set, wherein the cause identification code is data denoting a relationship between the symptom event set and a cause event, wherein the symptom event set is a combination of one or more symptom events, wherein the cause event is an event as a cause, wherein the symptom event is an event generated having the cause event as the cause, and wherein the processor:

(a) detects one or more first events;

(b) selects from among the event cause information a first cause identification code corresponding to the symptom event set matching a combination of the one or more first events;

(c) identifies the cause event denoted by the first cause identification code as the generation cause of the one or more first events;

(d) in a case where a composition of the computer system has been changed to eliminate the cause of generation of the one or more first events, changes the event cause information to event cause information corresponding to a post-change composition of the computer system; and (e) notifies an administrator of information related to a second cause identification code by selecting from among the post-change event cause information the second cause identification code corresponding to the symptom event set that matches the symptom event set denoted by the first cause identification code, and displaying information related to the second cause identification code on the display device, wherein the storage resource stores a physical device information showing a relationship between a virtualized virtual device, which exists inside the computer system and is able to become the source of generation of an event, and a real physical device related to the virtual device, and wherein the processor, in a case where a generation-source device of the cause event denoted by the first cause identification code is the virtual device, identifies the physical device related to the generation-source device of the cause event of the first cause identification code based on the physical device information, identifies all the virtual devices related to the identified physical device, adds all the cause identification codes that include the identified virtual device as the generation-source of this cause event to the cause identification code selected by comparing the symptom event set of the first cause identification code with the symptom event set of the cause identification code included in the post-change event cause information, and selects the same as a second cause identification code.

* * * * *